(12) United States Patent
Coote

(10) Patent No.: US 10,474,116 B2
(45) Date of Patent: Nov. 12, 2019

(54) DEVICE SYNCHRONIZATION AND TESTING

(71) Applicant: Centrica Hive Limited, Windsor, Berkshire (GB)

(72) Inventor: Matthew Timothy Coote, Kent (GB)

(73) Assignee: CENTRICA HIVE LIMITED, Windsor, Berkshire (GB)

( * ) Notice: Subject to any disclaimer, the term of this patent is extended or adjusted under 35 U.S.C. 154(b) by 288 days.

(21) Appl. No.: 15/510,554

(22) PCT Filed: Sep. 10, 2015

(86) PCT No.: PCT/GB2015/052625
§ 371 (c)(1),
(2) Date: Mar. 10, 2017

(87) PCT Pub. No.: WO2016/038380
PCT Pub. Date: Mar. 17, 2016

(65) Prior Publication Data
US 2017/0242414 A1    Aug. 24, 2017

Related U.S. Application Data

(60) Provisional application No. 62/048,957, filed on Sep. 11, 2014.

(51) Int. Cl.
*G05B 17/02* (2006.01)
*H04L 29/08* (2006.01)
(Continued)

(52) U.S. Cl.
CPC .............. *G05B 17/02* (2013.01); *G06F 1/14* (2013.01); *H04L 12/2803* (2013.01); *H04L 67/025* (2013.01)

(58) Field of Classification Search
None
See application file for complete search history.

(56) References Cited

U.S. PATENT DOCUMENTS 8,370,124 B1 * 2/2013 Gold ...................... B64G 7/00
700/25
2003/0217341 A1  11/2003 Rajsuman et al.
(Continued)

FOREIGN PATENT DOCUMENTS

CN    1376931 A    10/2002
CN    1558328 A    12/2004
(Continued)

OTHER PUBLICATIONS

PCT International Search Report and Written Opinion from International Application PCT/GB2015/052625, dated Dec. 4, 2015, 9 pages.

*Primary Examiner* — Kenneth M Lo
*Assistant Examiner* — Istiaque Ahmed
(74) *Attorney, Agent, or Firm* — Tucker Ellis LLP; Michael G. Craig

(57) ABSTRACT

The present invention provides a platform that enables devices, services and applications to be connected together. Creating a "connected environment" via this platform requires co-ordinating multiple device manufacturers and service providers, and multiple standards/protocols. Advantageously, the platform removes the requirement for different manufacturers of different devices to adopt common protocols to enable device connection, and further, the platform removes the burden of configuration away from the consumer. Time-dependent behaviors, and time-dependent behaviors of groups of devices, may be tested in a simulated environment to identify emergent behaviors and software bugs before they are implemented via the platform, to enhance the user experience.

25 Claims, 10 Drawing Sheets

(51) Int. Cl.
*H04L 12/28* (2006.01)
*G06F 1/14* (2006.01)

(56) References Cited

U.S. PATENT DOCUMENTS

| | | | |
|---|---|---|---|
| 2006/0123297 | A1 | 6/2006 | Reichert et al. |
| 2010/0070255 | A1 | 3/2010 | Biltz et al. |
| 2011/0106321 | A1* | 5/2011 | Cherian ............... H02J 3/00 |
| | | | 700/286 |
| 2013/0274928 | A1* | 10/2013 | Matsuoka .......... G05D 23/1904 |
| | | | 700/276 |
| 2014/0039869 | A1* | 2/2014 | van den Berghe ..... G06F 9/455 |
| | | | 703/27 |

FOREIGN PATENT DOCUMENTS

| | | |
|---|---|---|
| CN | 1774640 A | 5/2006 |
| CN | 101246444 A | 8/2008 |
| CN | 101710351 A | 5/2010 |
| CN | 102307369 A | 4/2012 |
| JP | 2004021904 A | 1/2004 |

\* cited by examiner

DEVICE SYNCHRONIZATION AND TESTING

FIELD OF THE INVENTION

The present invention generally relates to systems, methods and computer program code that enable devices, services and applications to be connected together, to provide an Internet of Things. More particularly, the invention provides systems and methods for synchronising time across the multiple connected devices.

BACKGROUND OF THE INVENTION

There are a large number and wide variety of home and office appliances and physical devices available for the consumer on the market. It is becoming more common for such consumer electronic goods and appliances to be connected to each other, and/or to be connected to the internet to enable a user to control and/or monitor a particular device via the internet, when the user is located remote from the particular device itself.

The proliferation of connected devices in the home/office creates a need for a simpler user experience. In the 1990s, a household typically contained only one physical device that was connected to the internet—the personal computer (PC). Today's households and offices generally have several connected devices (e.g. PCs, smartphones, tablet computers, TVs, smart thermostats, etc.), and it is feasible that future households will have tens, perhaps hundreds, of connected devices. Examples of connected devices and software applications ("apps") currently available on the market are physical devices and apps which enable a user to monitor their energy consumption (e.g. gas and/or electricity), and determine how they are using the energy in their home/office. For example, a particular physical device may be a smart energy monitor that is able to determine how much energy is used in a home for different categories of energy usage, such as lighting, heating, cooking etc. The physical device may be connected to the internet and may be remotely monitored by a user via a user interface (UI) or app on a user's smartphone. Another example of a connected physical device is a smart thermostat, which could be monitored remotely by a user and may be controllable remotely to allow a user to turn the heating on he returns to his home/office, or to turn the heating system off automatically when he indicates he is no longer in his home.

Ordinary consumers may not have the time, interest or ability to devote their attention to individually monitoring connected devices (e.g. to check that they are operating as expected). For example, a typical consumer may not have the time or interest to engage with their smart thermostat to control their heating system and would rather use a device which automatically controls their heating system. For some users, it would thus be preferable if the connected devices were largely autonomous, working unobtrusively in the background, taking care of themselves in regard to provisioning of resources, updating, and everyday performance.

Furthermore, ordinary consumers may not have the time, interest or ability to configure the devices to create a "connected environment" (e.g. a "connected home" or "connected office". Creating a "connected home" typically requires the use of an in-home hub device (a hardware device) to which all physical devices and appliances are connected. The hub may enable low-power edge devices in the home/office to connect to the internet, to services accessible via the cloud, or to other devices via the internet. This is generally enabled by the use of a gateway (a network node, telecommunications router or proxy server that is able to route data between networks that may use different communication protocols, or a computer/computer program that is configured to perform the same tasks). The gateway may be accessible via the hub, or the hub may contain a computer program/software that performs the task of a gateway. The gateway translates between internet protocols and different communication protocols (e.g. the ZigBee® protocol used to create personal area networks).

Generally speaking, electronic devices have previously been connected to the internet in an uncoordinated manner, with each device manufacturer using their own methods and preferred communication protocols. Consumers who own different electronic devices from different manufacturers/vendors are often faced with the difficulty of having to use different techniques to configure each electronic device to connect to the internet, which makes it difficult for a user to monitor/control their devices remotely. Furthermore, there may be a lack of interoperability between electronic devices even if they are advertised as being able to connect to other electronic devices.

The present applicant has recognised the need to provide a platform which more simply enables multiple different home and office electronic devices to be connected to the internet, and to each other.

SUMMARY OF THE INVENTION

Broadly speaking, embodiments of the present invention relate to the provision of a system that enables devices, services and applications to be connected together to create a "connected environment" and/or to a system that provides a simplified way of creating an "Internet of Things" (a term used to mean the interconnection of uniquely identifiable devices within the existing internet infrastructure). Creating a "connected environment" via this system requires co-ordinating physical devices made by multiple manufacturers, services provided by multiple service providers, and multiple standards and communication protocols. However, time-dependent actions specified by a user may be specified with reference to a particular clock, which may not show the same time as the internal clock of the physical device for which the action is specified. For example, if a user wishes to remotely control their heating to turn on at 17:30, so that their home starts warming-up before he returns from work, the boiler may start firing before or after the time on the clock used by the user, if the boiler's internal clock does not match the time on the user's clock. As a result, the user's home may use more energy than desired (as a result of the boiler firing too early), or may be colder than desired (as a result of the boiler firing too late). The problem is exacerbated for more complex time-dependent actions, such as the weekly schedule of a thermostat to turn a boiler on/off for heating and/or hot water.

Physical devices (sensors and actuators) may be computationally constrained and testing them is typically a highly manual process (unreliable, slow and expensive). It may be desirable to test the physical devices so that they operate as expected, particular if their behaviour may be time-dependent. For example, modern thermostats are programmable to set a weekly (or monthly) schedule that specifies when a boiler turns on to generate hot water and/or to provide central heating. It may be desirable to check that the thermostat correctly interprets and implements the schedule. Testing possible schedules (or all possible schedules) may be a lengthy manual process and may therefore be expensive and error prone. Furthermore, manual testing requires testing individual physical devices one-by-one. It is desirable to be able to batch test multiple devices together.

According to a first aspect of the invention, there is provided a system comprising: at least one physical device, wherein the physical device is addressable by the system, and wherein the physical device is operated or controlled by a device driver; a simulation module which comprises storage means for storing a copy of the device driver for the at least one physical device; and at least one processor which is configured to: receive at least one time-dependent command for the at least one physical device, wherein time is obtained from a reference clock; test system operation within the simulation module by: defining a test period; adjusting said reference clock for said test period; applying the at least one time-dependent command in said test period to the copy of the device driver associated with the specified physical device to simulate behaviour of the specified physical device; and outputting any problems with the simulated behaviour of the specified physical device; and control a physical device within the system by sending the time-dependent command to the device driver associated with the specified physical device, wherein the device driver applies the time-dependent command to the physical device.

In embodiments, the system may further comprise a plurality of physical devices. That is, the system may enable the control of at least one physical device, or multiple physical devices.

According to a related aspect of the invention, there is provided a method for testing a plurality of devices, services and applications which are interconnected in a single platform, the method comprising: receiving at least one time-dependent action specified for at least one physical device, wherein time is obtained from a reference clock; defining a test period; adjusting said reference clock for said test period; applying each time-dependent action in said test period to a copy of a device driver which is associated with the specified physical device to simulate behaviour of the specified physical device, wherein the copy of the device driver is a copy of the driver used to operate or control the at least one physical device; and outputting any problems with the simulated behaviour of the specified physical device.

The following features apply to both aspects.

Testing schedules or time-dependent instructions/commands before implementing them on one or more physical devices may be achieved by simulating operation of a physical device in a simulated environment which may be within the simulation module. The simulation module may comprise copies or instances of driver software associated with the or each physical device coupled to the system. The copy of the driver software is used to perform the testing of a physical device. Problems in the driver software of the physical device can be identified in the simulated environment, and since all physical devices of a particular type/version made by a particular manufacturer will be operated and/or controlled by the same driver software, the problem is identified for all physical devices without having to individually and manually check them all. The copies of device drivers may be arranged to interact with simulation code, the simulation code simulating behaviour and/or responses of one or more physical devices. Furthermore, the simulated environment can be used to test combinations of physical devices. For example, if a thermostat is remotely operable or programmable, the simulated environment may include simulated versions (i.e. copies of the device drivers associated with the physical devices and/or device simulation code for the physical devices) of a user interface/user device which is used to remotely control the thermostat, as well as the simulated thermostat. Tests run in the simulated environment can check whether instructions set by the user are correctly interpreted by the thermostat and correctly implemented. This may help to identify and fix any potential problems a user could face when trying to configure their user device to control the thermostat in the real world.

To enable the testing, the system may be configured to inject time into the software underlying a physical device (e.g. the copy of the device driver), in the simulated environment. Thus, in the simulated environment, the time values within the software code associated with a physical device are substituted throughout the code with time obtained from a reference clock. The reference clock may preferably be a controllable time signal which may be used to set particular times in the code, set time sequences for testing the code, and/or to accelerate time so that the code can be tested over periods of time. Accelerating time to test the device or a schedule may be particularly useful to check if any problems occur over long periods of time, or transitions between days, weeks, months and years. For example, the accelerating time can be used to check if the device operates correctly during ordinary years and leap years, and/or if the device operates correctly on days when daylight saving time takes effect.

Thus, the processor may be configured to adjust the reference clock to accelerate time for the test period. Alternatively, the processor may be configured to adjust the reference clock to change the time period, e.g. to step time forwards.

The time-dependent actions/commands specified for a physical device are therefore tested in the simulated environment prior to being provided to the physical device for implementation. In embodiments, the time-dependent actions are adjusted by the system to account for the clock offset between the reference clock and an internal clock of the physical device, so that the actions are implemented at the desired time. This is particularly useful if multiple synchronised actions are specified. For example, a user may remotely instruct a security camera to turn on at 22:00 and instruct a recording device to record the images captured by the camera at 22:00. However, if the instructions are not adjusted to account for different clock offsets associated with the camera and the recording device, the security may turn on at one time, and the recording device may only turn on at a later time, thereby not recording all of the images captured by the camera. However, preferably, time-dependent commands are sent to the device driver of a physical device for application based on the reference clock, and the internal clock of the physical device is essentially ignored. For example, if a time-dependent command is to turn a thermostat temperature up to a required temperature at 14:00, the device driver is configured to adjust the thermostat temperature when the reference clock reaches 14:00, regardless of the time of the internal clock.

The processor adjusts for the clock offsets before sending the instructions to the physical devices. The processor may be located centrally within the system. Additionally or alternatively, the physical devices may have the processing capability to adjust the instructions themselves—in this case, the physical devices are provided both with a time-dependent instruction and a reference time, so that the processor of the physical device can itself determine its offset and implement the instruction at the required time. In further alternative embodiments, the physical devices may have the processing capability to query a reference clock and automatically adjust their internal clocks to match the reference clock. However, this is dependent on whether a manufacturer has provided the physical device with the required circuitry and software to take such actions. Thus, providing pre-adjusted instructions to the physical devices may be used for physical devices that do not have the required processing ability to perform the adjustment themselves.

In embodiments, the reference clock may be a single reference clock defined within the system. Additionally or alternatively, the reference clock may be a call to obtain time from an external clock provided outside of the system. Thus, time-dependent control may only be possible when the device driver is able to query the reference clock for the current time. If the device driver cannot do so, because, for example, the connection required to query the external clock has temporarily been lost, the device driver may switch to using the internal clock of the physical device to apply time-dependent commands.

In embodiments, the system may further comprise a precedent module that represents a first abstraction layer or module and is used to abstract the physical devices connected into the system. The precedent module may be used in addition to or instead of the simulation module, and the testing of time-dependent commands may be performed using the precedent module. Canonical forms may be used by the first abstraction layer to strip physical devices of their implementation details so that the physical devices connected in the system are defined only by their behaviours/functionalities. At least one canonical device (i.e. a virtual device defined by some software) is used to represent at least some of the functionality of the physical device in the system which has the behaviours defined by a particular canonical form. The canonical device has a state or set of states, can accept commands and can emit events as it senses changes in its state. The canonical device is preferably pre-defined in the system, and the monitoring/controlling of a physical device is performed via its associated canonical representation. This simplifies the monitoring/controlling because the system does not need to know anything about the brand or version of the physical device in order to interact with the physical device. The system only needs to know that the physical device has certain known, pre-defined behaviours (defined by the or each canonical form—where multiple canonical forms are captured in one physical device). Thus, the canonical device(s) may be used to test time-dependent commands before they are sent (by the canonical device or by a device driver) to the associated physical device for implementation.

A physical device may be a relatively simple device with a single function (e.g. a printer that is only able to print). The physical device may be associated with a canonical device, which corresponds to a pre-defined canonical form that defines the behaviour/capability of the physical device. Additionally or alternatively, a physical device may be more complex and have two or more functions (e.g. a machine that is able to print, copy and scan). A complex physical device may therefore be associated with one or more canonical devices, where each canonical device corresponds to a canonical form that defines one of the functions of the physical device. In embodiments, the system may comprise more than one physical device, and each physical device may be associated with at least one canonical device.

The precedent module may comprise a database storing at least one pre-defined canonical device, wherein the canonical device corresponds to a pre-defined canonical form, the canonical form defining a set of minimum capabilities for a type of physical device, wherein the at least one physical device is associated with at least one canonical device which matches at least some of the capabilities of the physical device.

Preferably, the at least one processor is configured to test system operation by: defining a test period; adjusting said reference clock for said test period; sending each time-dependent command in said test period to the at least one canonical device which is associated with the specified physical device to simulate behaviour of the specified physical device; and outputting any problems with the simulated behaviour of the specified physical device.

The system may further comprise an archetype module which comprises a database storing one or more synthetic devices, wherein each synthetic device comprises one or more canonical devices and at least one rule, the at least one rule defining how the one or more canonical devices are combined to form the synthetic device. The archetype module is a second device abstraction layer/module and may comprise a database or store of one or more synthetic devices. A synthetic device is a virtual device (piece of software) which embodies intelligence for other devices (physical, canonical or synthetic) that complies with a particular canonical form. Synthetic devices may be formed by combining one or more canonical devices with a proposition/rule that defines how the canonical devices are combined to define the overall behaviour/function of the synthetic device. Synthetic devices may be formed by combining one or more canonical devices with one or more synthetic devices, and/or by combining two or more synthetic devices. A user may be able to monitor and/or control a synthetic device via the user interface. Consequently and indirectly, a user may be able to control real, physical devices that underlie the synthetic device. All synthetic devices which follow the same canonical form are equivalent, because they have the same behaviour/function. Thus, a canonical form defines the minimum function or a set of functions/capabilities of a synthetic device. The archetype module may be used in addition to or instead of the simulation module and/or the precedent module, and the testing of time-dependent commands may be performed using the archetype module. The synthetic device(s) may be used to test time-dependent commands before they are provided (by the synthetic device, canonical device or a device driver) to the associated physical device for implementation.

The at least one processor may comprise a single or multiple processors which share the functionality. The at least one processor may be configured to test the system to identify emergent behaviours within groups of physical, canonical and/or synthetic devices over the test period, e.g. by simulating the speeding-up of the reference clock. Similarly, the at least one processor may be further configured to test an interface between each physical device and the associated canonical device over the test period, e.g. by simulating the speeding-up of the reference clock. In this case, the at least one processor may be located in the physical device. The at least one processor may be configured to test an interface between each synthetic device and each associated canonical device over the test period. In this case, the at least one processor may be located remote from the physical device.

The or each processor may be implemented in any known suitable hardware such as a microprocessor, a Digital Signal Processing (DSP) chip, an Application Specific Integrated Circuit (ASIC), Field Programmable Gate Arrays (FPGAs), etc. The or each processor may include one or more processing cores with each core configured to perform independently. The or each processor may have connectivity to a bus to execute instructions and process information stored in, for example, a memory.

The test period may have a duration of time specified in days, weeks, months or years. By way of example only, the pre-determined period may be "five days", or "four years" (to cover a leap year), or "February to April", or "February to April for four consecutive years" (to cover leap days), etc. Additionally or alternatively, the pre-determined period of time may correspond to at least a length of a time over which an event takes place. In other words, the test period includes at least one (preferably a plurality) of time-dependent instructions. For example, if a burglar alarm is programmed to turn on between 22:00 and 06:00, other devices (e.g. a security camera, a recording device, a device to send an alert to a security service, a device to send an SMS to the building owner etc.) may be tested to ensure they work as expected in the same period of time, and that they can receive inputs from the burglar alarm to take any necessary action (e.g. send an alert/SMS if the burglar alarm is tripped).

The system may further comprise a user interface to enable a user to monitor and/or control the at least one physical device. In embodiments, the user interface may be a graphical user interface provided on a computing device or mobile computing device, and time-dependent actions specified for each of the physical devices may be specified using the user interface with reference to the reference clock.

As set out above, the precedent module may comprise a database storing the plurality of pre-defined canonical forms. In embodiments, the at least one processor may be configured to implement an object capability model which defines the security permissions associated with each canonical and synthetic device (where present). Preferably, the at least one processor may be further configured to control the physical device(s) by applying the permissions set by the object capability model. The object capability model is a computer security model defining the permissions granted to the user, each canonical device and each synthetic device (if used) to access the functions and data of the canonical, synthetic and physical devices.

The model is defined with software or computer code and may be implemented by the system. The model may be used to grant access to only some of the available functions or data, for example the functions may be limited to monitoring only. Different objects (devices) may have different levels of permissions, i.e. a different set of limited functions. For additional security, the object capability model may use a caretaker object to store and define the permissions for each user, canonical device and/or synthetic device in relation to each other canonical, synthetic or physical device. The model can destroy one or more of the caretaker objects as and when necessary, which removes access by the user, canonical device and/or synthetic device to the other device associated with the caretaker object. This may be particularly useful for consumer devices for which it is difficult to grant access to the device and/or data produced by the device. The object capability model may be used to set permissions with reference to a canonical device, such that a party may set the permissions for all physical devices that are represented by the same canonical device (i.e. which follow the same canonical form) at once. This enables permissions to be set quickly for large numbers of devices.

In embodiments, the object capability model grants permissions to the user and to each canonical device and/or each synthetic device for a specified time period, wherein expiration of the time period automatically revokes the permissions. The specified time period may be for particular days of the week, particular hours of the day or for particular lengths of time (e.g. one month, one day, etc.). The specified time period may be different for each device and/or user. The specified time period may be for the time a particular event lasts. For example, it may be possible to grant access to a security firm to the video feed of a security camera only when a burglar alarm in a property has been triggered, so that they can assess the situation. The permissions may be revoked as soon as the burglar alarm has been turned off or reset, for privacy.

In embodiments, the user is a third party and the object capability model is configured to grant permissions to the third party which limit the third party's access to the functions and data produced by the canonical, synthetic and physical devices.

In embodiments, the permissions granted for a specified time period for each canonical device are defined with respect to the reference clock. Similarly, the permissions granted for a specified time period for each synthetic device may be defined with respect to a reference clock.

In embodiments, the reference clock is automatically synchronised with Coordinated Universal Time.

In embodiments, the plurality of physical devices are located at one or more locations. The one or more locations may include a home or an office (i.e. a fixed or static place) and/or a mobile location (i.e. a moving or changeable place). The mobile location may be a vehicle (e.g. a car, a boat, a bicycle). In embodiments, the plurality of physical devices comprises a mobile device or a wearable device, located with or on a human or animal (e.g. wearable technology, health/fitness monitors, smart pet chips, baby monitoring devices etc.).

In embodiments, the system further comprises a hub device to which the plurality of physical devices are coupled for interconnection within the system. Preferably, the hub device is a hardware device coupled to a wired or wireless internet router. The hub device may be located in a location which is proximate most of the plurality of devices and may thus be considered as a local hub device. For example, where the plurality of devices are generally located in a user's home, the hub device may be an in-home hub device.

The precedent module may be located in the local hub or in a remote server. Similarly, the archetype module may be located in the local hub or in a remote server. The database for the object capability model may be stored in the local hub or in a remote server. The precedent module, the archetype module and the database may be located together in the local hub, together in the remote server or split across the local hub and the remote server.

The hub device may comprise a networking abstraction module. The networking abstraction module may be configured to: communicate with each of the plurality of physical devices by one or more networking protocols; and remove details of the one or more networking protocols from the system. The networking abstraction module simplifies the way in which the system components communicate with and receive data from the physical devices, as the components do not individually need to translate between communication protocols.

In embodiments, the at least one processor comprises a processor which is located in the precedent module and which associates each physical device to a canonical device. The at least one processor may comprise a further processor which is located in a remote server and which is configured to control each physical device.

In embodiments, the at least one processor is configured to control each physical device in response to a user input on the user interface.

The invention also provides a carrier carrying processor control code to, when running, implement any of the above methods, in particular on a non-transitory data carrier—such as a disk, microprocessor, CD- or DVD-ROM, programmed memory such as read-only memory (Firmware), or on a data carrier such as an optical or electrical signal carrier. Code (and/or data) to implement embodiments of the invention may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language). As the skilled person will appreciate such code and/or data may be distributed between a plurality of coupled components in communication with one another. The invention may comprise a controller which includes a microprocessor, working memory and program memory coupled to one or more of the components of the system.

BRIEF DESCRIPTION OF THE DRAWINGS

The invention is diagrammatically illustrated, by way of example, in the accompanying drawings, in which.

DETAILED DESCRIPTION

Glossary of Terms

Figure 1:
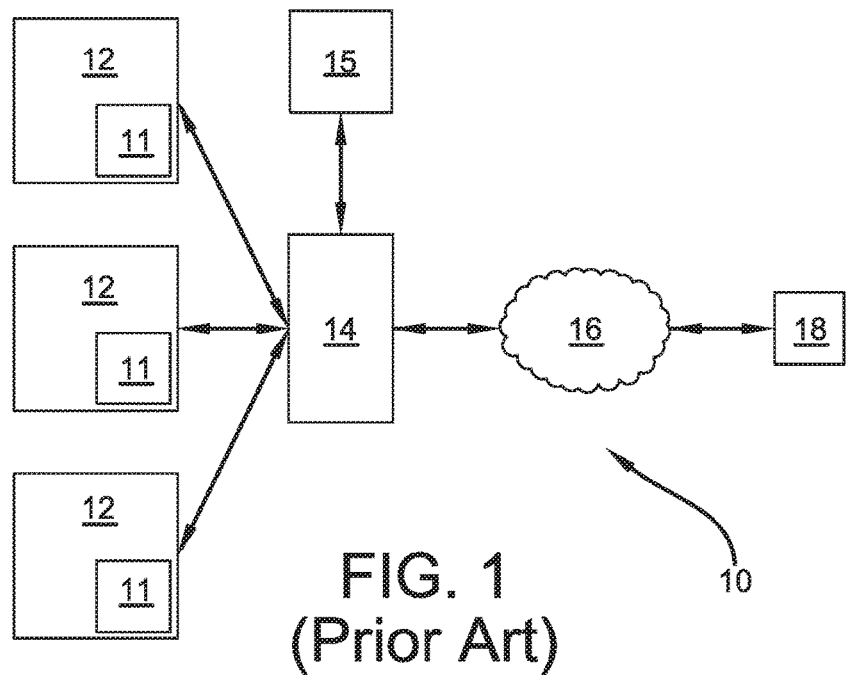
FIG. 1 illustrates a prior art system of connecting physical devices.

App=a shortening of the term "application software", and refers to one or more computer programs designed to carry out operations for a specific application. The term is used throughout the description to mean application software and includes 'mobile apps", i.e. computer programs designed to run on smartphones, tablets and other mobile devices.

Gateway=a network node, telecommunications router or proxy server that is able to route between networks that may use different communication protocols. The gateway may include means to translate/map between different protocols in order to enable data sent over a network using a particular communication protocol to be converted into a different data format suitable for transmission over a network that uses a different communication protocol. The term also covers a computer or computer program that is configured to perform the tasks of a gateway. The term "gateway" is used interchangeably with the term "hub" throughout the description, where the hub is a piece of hardware that may comprise a computer program/software that performs the task of a gateway.

The cloud=a network of remote severs accessible via the internet and used to store, manage and process data in place of local severs/computers. The term is used interchangeably with "remote sever" in the description because features of the invention which are described as being in or accessible via "the cloud" could equally be in a server at a remote location (remote from the location of the physical devices).

A device=this is broadly used in the computer science sense to mean an entity that has a state, that can accept commands and that can emit events as it senses changes in the real world or its own condition.

Physical device=this is broadly used to mean a device that has been implemented in a piece of hardware, and may act as an actuator (to change the state of the surrounding environment), or a sensor (to detect the state of the surrounding environment). The term is also used to refer to consumer electronic goods and electronic appliances which have the capability to communicate with a hub/gateway. The devices are not limited to those goods which have been modified to include an identifier. Rather, the devices can be any goods which have the ability to communicate via the following example protocols: Wi-Fi, ZigBee, ZWave, IPv4, IPv6 etc.

Canonical form=this is broadly used in the computer science sense to mean a 'normal', 'canonical' or 'standard' way of representing an object that has a unique representation. The reduction to a canonical representation means that two objects (e.g. physical devices) can be deemed to be equivalent if their canonical representations are tested and determined to be equivalent. The canonical form may represent a behaviour associated with a device, and may include a series of (automatable) tests to determine if a device behaves as expected. A canonical form therefore enables a first level of device abstraction, because it represents a behaviour of a device but does not include any details on how the behaviour is achieved. It will be appreciated that a device may have more than one behaviour and thus a physical device may comprise the behaviour of multiple canonical forms.

Canonical device=software that represents a virtual device that complies with a particular canonical form. All canonical devices that follow the same canonical form are equivalent, because they have the same behaviour/function. Thus, a canonical device defines the minimum function or a set of functions/capabilities of a real, physical device with which it is associated. The canonical device is an abstracted version of a real, physical device because it represents a behaviour (or set of behaviours) of a device but does not include any details on how the behaviour is achieved. The canonical device has a state or set of states, can accept commands and can emit events as it senses changes in its state.

Synthetic device=software that embodies intelligence for devices (real or synthetic) that complies with a particular canonical form. Synthetic devices are composable because the grammar (in programming terms) used to exchange information and control between them is orthogonal to the functionality of an individual device's functionality or behaviour. More specifically, the term is used to mean a virtual device which may be formed by combining one or more canonical devices with a proposition/rule that defines how the synthetic device behaves/functions. The synthetic device provides a second level of device abstraction. All synthetic devices which follow the same canonical form are equivalent, because they have the same behaviour/function. Thus, a canonical form defines the minimum function or a set of functions/capabilities of a synthetic device.

Device abstraction=broadly, the term is used to mean that (physical) devices may be defined by a canonical form, and those which are defined by the same canonical form are therefore deemed equivalent. Device abstraction means all physical devices defined by the same canonical form behave as defined by that canonical form, even if the physical devices themselves vary in how the behaviour is achieved/implemented.

Abstraction module=a module for hiding the implementation details of a device (physical or canonical) such that the device is described by a behaviour or a set of functionalities. The term may be used interchangeably with "abstraction level/layer".

Precedent module=a module which contains canonical devices and so hides the technical specifications of a particular physical device, by reducing the physical device to an abstract/virtual canonical device defined by a canonical form. The term is used interchangeably with "first device abstraction module", because the precedent module provides a first level of abstraction from the physical devices. The term may also be used interchangeably with "first device abstraction level/layer". The module may be a hardware or software module, and may be provided locally for each connected environment or in a remote location.

Archetype module=a module which contains synthetic devices. The term is used interchangeably with "second device abstraction module" and may be used interchangeably with "second device abstraction level/layer". The module may be a hardware or software module, and may be provided locally for each connected environment or in a remote location.

Object capability model=a software-based computer security model that attaches authorisations or permissions ("capabilities") to entities that wish to access a service or data/information from an object. A capability specifies what services/data an entity can access from or with respect to an object. The model uses the capabilities as the primary means of providing authority and controlling access to the objects (or their services/data). In context, the model is used to define the permissions that different parties (users/devices) may have for devices (physical, canonical and/or synthetic) in the system, such that access to the controls or data associated with a device is controlled.

Location=this refers to the environment containing physical devices that are interconnected and coordinated by the system. The environment/location includes static or fixed locations (e.g. a home, a room or rooms within a home, an office, a workplace etc.) and mobile locations (e.g. in or on a vehicle). If the physical device is a mobile device or a wearable device (e.g. a smartwatch, a health monitor, smart clothing, a fitness/activity monitor, a pet monitor etc.), the location may also be with or on a human or animal.

Clock=this generally refers to a clock generator used in digital circuits and microprocessors, such as in the circuitry typically found within many consumer electronic goods (physical devices). The clock generator produces a clock signal, and the circuitry may use the clock signal to synchronise different parts of the circuit.

Clock synchronisation=this term refers to a problem which arises when the internal clocks of different electronic devices are different. Even when the clocks are initially set accurately, the clocks may differ after some time and are therefore no longer accurate or in-sync.

Reference clock=a virtual clock within the system or external to the system which is used by all components of the system for synchronisation and event scheduling. The term includes a reference clock that is a piece of software or code that includes a call function to a obtain time from an external clock.

Clock offset=the time difference between the time on a clock within a physical device, and a reference clock.

Canonical clock=a virtual, reference clock provided within a canonical device.

Synthetic clock=a virtual, reference clock provided within the synthetic device.

Test double=a generic term for any kind of dummy object used in place of a real object for testing purposes.

Processor=a generic term for implementing the described processes via software, hardware, firmware or a combination of software and/or firmware and/or hardware. The processor may be implemented in any known suitable hardware such as a microprocessor, a Digital Signal Processing (DSP) chip, an Application Specific Integrated Circuit (ASIC), Field Programmable Gate Arrays (FPGAs), etc. The processor may include one or more processing cores with each core configured to perform independently. The processor has connectivity to a bus to execute instructions and process information stored in, for example, a memory.

Description

FIG. 1 illustrates a prior art system 10 for connecting and automating physical devices and appliances in a home or office via a single platform. The system may include a user device such as a smartphone 18 that may be used by a user to monitor and/or control the physical devices remotely. The monitoring and controlling may be achieved via a user interface running on, or accessible by, the smartphone. The system comprises one or more physical devices 12, which may be for example, consumer electronic goods, smart meters, smart sensors, home monitoring devices, lighting devices, heating devices etc. The one or more physical devices 12 may therefore be of different types and may be made by different manufacturers. The physical devices 12 and user device 18 used to monitor/control the physical devices may also be made by different manufacturers, adding a further level of complexity into the communication and data transfer between the physical devices and user device.

The illustrated system enables two-way physical device control through an in-home hub 14. All physical devices connected into the system may be connected to the hub device 14 (a hardware component) such that the physical devices in the home/office can connect to the internet, to services accessible via the cloud, or to other devices via the internet. This connectivity is generally enabled by the use of a gateway (not shown) that is able to route data between networks that use different communication protocols. The gateway may be accessible via the hub, or the hub 14 itself may contain a computer program or software that performs the task of a gateway. The gateway translates between internet protocols and different communication protocols (e.g. the ZigBee® protocol used to create personal area networks).

The hub accesses the internet by, for example, connecting to a broadband internet router (and thus, provides a way for the physical devices to connect to the internet). The physical devices 12 are thereby connected to a cloud-based platform 16 by a wired or wireless connection (via the hub) and the platform 16 links devices, applications and analytics software together. The platform 16 may enable devices and data to be accessible via a single user interface. The platform 16 may include data analytics software which turn 'dumb' devices into intelligent, smart devices. Users may use their smartphone 18 (e.g. via a software application) to monitor/control their in-home physical devices 12. For example, consumers may use an app to remotely turn off a physical heating device after they have left their home, so that energy is not wasted on heating an empty home. The platform thereby provides the user with a convenient way to operate the physical device without having to be physically near it.

The hub 14 may also act locally to apply rules or controls to physical devices 12 within the home, even if the home is offline. The functions performed by an in-home hub typically mean the hub has a sufficiently small footprint such that it can even be embedded within existing gateway devices, such as broadband routers and media set-top boxes. However, as physical devices and home networks grow in capability, physical devices may preferably connect to the internet directly, without the need for a hub. The connection of multiple physical devices into the system may be achieved by running device rules in the cloud. Cloud-based computing is advantageous because it is dynamically scalable, by providing services over the internet. A user is able to access the services without any knowledge of the technical aspects of the cloud. For example, a user may access a service via their web browser, where the service is provided by a cloud-based service, and both the software and any data used to provide the web service are stored in the cloud remote from the user. However, the platform 16 of the prior art system may not be able to cope with requests to connect received from multiple (e.g. hundreds of thousands to tens of millions) different physical devices that use multiple different communication protocols and have different technical specifications. Different versions of the same physical device may be configured differently, such that the platform needs to be able to communicate with them in different ways (even if only slightly different). By way of example only, the platform may need to distinguish between smartphones made by different manufacturers (e.g. BlackBerry®, Apple®, Samsung® etc.), different models of smartphone by each manufacturer (e.g. BlackBerry Z10®, BlackBerry Q10® etc.), and different versions of each model of smartphone (e.g. 2G, 3G, 4G versions), so that it can communicate with the physical device correctly. The platform 16 may need to be regularly updated to keep track of different types of physical device, different models and versions, which is inefficient and time consuming. Similarly, the platform may need to distinguish between thermostats made by different manufacturers (e.g. Honeywell, Drayton, Salus, etc).

A further disadvantage of this prior art system is the difficulty of adapting the system to connect a new physical device, which may have a different technical specification to any of the existing physical devices connected to the system. For example, the existing physical devices in the system may include a temperature sensor or thermostat which senses temperature in a property in degrees Celsius (° C.). Adapting the system to connect a physical temperature sensor or thermostat which senses temperature in degrees Fahrenheit (° F.) may require changes to be made at each level of the system to ensure that the system components are able to communicate with each other correctly and to ensure the new unit of measurement is understood by the system components. This relatively simple change may require significant man-hours to implement, since the change may require engineers and software developers to adapt the protocols and computer code at each level of the system.

Furthermore, typically, consumer electronic goods often comprise a microprocessor or electronic circuit that includes a clock generator. The internal clocks 11 of the physical devices 12 are generally used to synchronise different parts of the circuit. However, even when the clocks are initially set accurately, the clocks 11 of the physical devices may differ after some time (e.g. due to clock drift) and are therefore no longer accurate or in-sync. This may make it difficult to co-ordinate physical devices. One way to ensure the clocks of the physical devices are synchronised is to synchronise each physical device clock with an external reference clock 15. For example, the Network Time Protocol (NTP) may be used to synchronise each physical device 12 to within a few milliseconds of Coordinated Universal Time. NTP can usually maintain the time of the internal clocks to a high level of accuracy, but this method of synchronisation requires each physical device to periodically check and synchronise its internal clock via the internet. Thus, a disadvantage of this synchronisation method is that it involves an inefficient use of bandwidth, particularly in properties which contain a large number of devices connected to the internet. Furthermore, some physical devices may lack the processing power or circuitry required to query a reference clock and update its internal clock accordingly.

Figure 2:
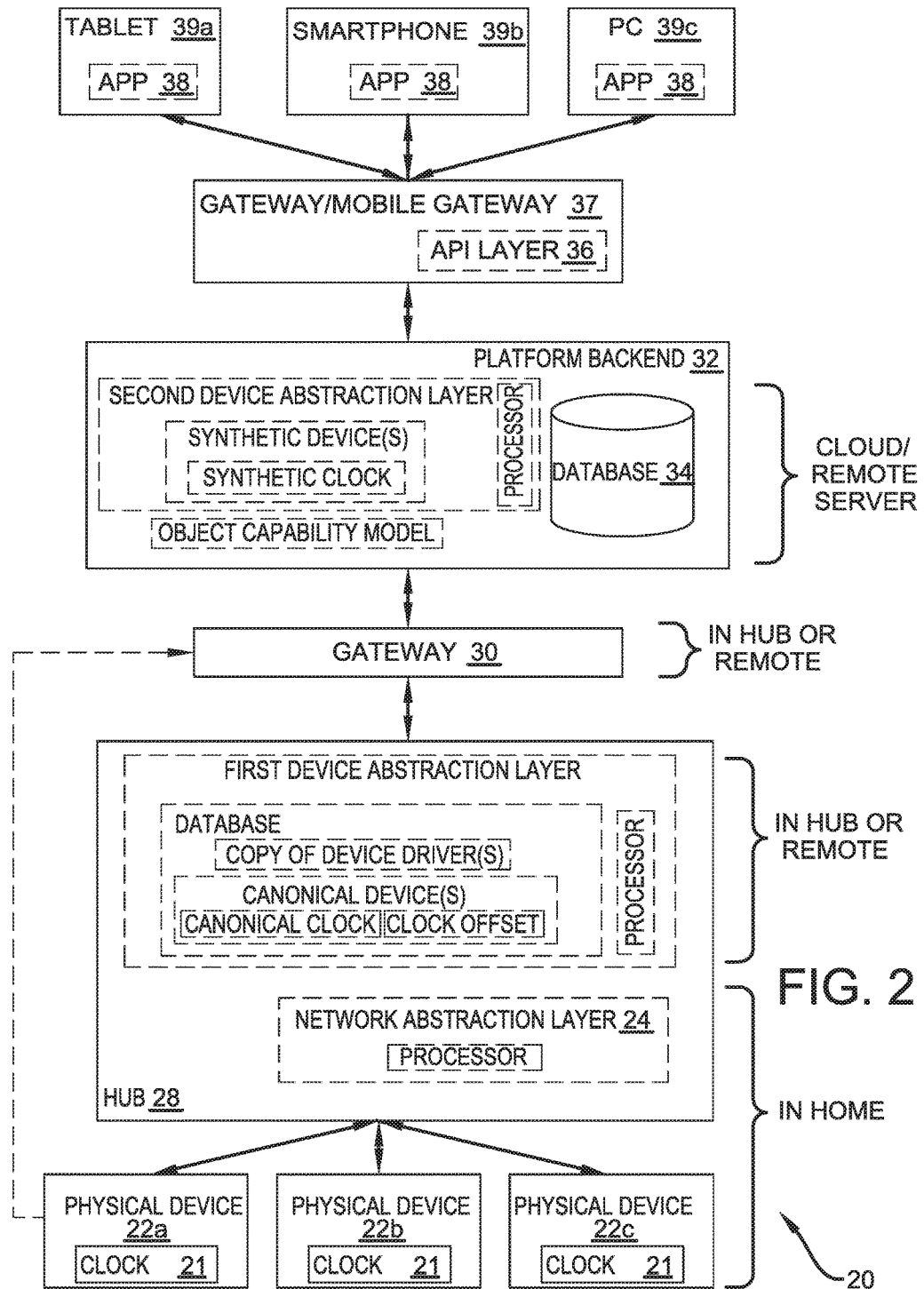
FIG. 2 shows a block diagram representing a system of connecting physical devices according to an embodiment of the present invention.

FIG. 2 illustrates a system for connecting physical devices to create a "connected environment" according to an embodiment of the present invention. The system 20 manages the complexity of multiple physical devices, multiple physical device types and multiple network protocols by removing all knowledge from the platform to simplify the system. In the system 20, a platform receives 'simple' data from the physical devices 22a, b, c and does not need to understand anything about the physical device from which the data originates. The physical devices 22a,b,c may each comprise an internal clock 21. Similarly, the platform does not need to know anything about the user-side devices 39a,b,c and/or app(s) 38 which may be used to monitor/control the device(s) 22a,b,c. It will be appreciated that three physical devices and user side devices is simply an arbitrary choice to facilitate illustration. Any number of devices may be interconnected in the system.

A user may monitor/control physical devices 22,a,b,c using a user-side control device such as a tablet computer 39a, a smartphone 39b or a PC or laptop 39c, or any other suitable means, and in embodiments, the monitoring/controlling is performed via a user interface such as an app 38 running on, or accessible via, the control device. The user interface may alternatively be provided elsewhere and accessible via the control device (e.g. via a web browser running on the control device). The user-side control devices are connected to a gateway 37 whereby they may be interconnected with each other and/or with the mobile devices within the system. Similarly, the mobile control devices (such as the smartphone 39b) are connected to a mobile gateway to be interconnected within the system 20 using the mobile communications network. The system 20 comprises a platform backend 32 which may be able to communicate with the control devices 39a,b,c and/or the app(s) 38 accessible via the control devices, via an application programming interface (API) layer 36. The API layer specifies how software components of the apps 38 and the platform communicate with each other, and enables data to be shared between otherwise distinct applications. The API layer may be coupled to the gateway/mobile gateway 37 or be provided as a separate, distinct module within the system between the platform backend 32 and the gateway 37.

In the system of FIG. 2, specific knowledge about the implementation details of the control devices and the physical devices 22$a,b,c$ is removed from the system, which simplifies the creation and management of the system. This is achieved by providing two layers of abstraction between the physical devices 22$a,b,c$ and the control device 39$a,b,c$ or app 38 used to monitor/control the physical devices 22$a,b,c$, preferably in combination with an object capability model. The platform used to implement the system (i.e. software or hardware architecture) may be provided in a hub device 28 or in the cloud/remote server. Additionally or alternatively, the functionalities of the platform may be distributed between the hub and the cloud/remote server(s). Physical devices may connect into the system through the hub, or directly, as explained in more detail below.

Broadly speaking, and as explained in the glossary section, an abstraction layer or level is a technique used in computer science to hide the implementation details of a device so that the device (e.g. a physical device) is described by its behaviour, or a set of behaviours/functionalities. The abstraction technique can therefore identify a device as being a particular type based on its behaviour, and this enables other components in a system to communicate with the device without needing to know any of the specific details (e.g. technical specification, model number, version number) of the device. Many modern operating systems use layers of abstraction or a hierarchy of abstraction layers. For example, in order to read and write to a device at application level, a program may call a function to open the device (e.g. a real device such as a terminal, or a virtual device such as a network port or file). The device's physical characteristics are mediated by the operating system, and the operating system presents an abstract interface that allows a programmer to read and write bytes from/to the device. The operating system then performs the actual transformation needed to read and write the stream of bytes to the device. Thus, in this example, there is one layer of abstraction between the device and the operating system.

A first abstraction layer or module (also called a "precedent module") is used to abstract the physical devices which are interconnected within the system. In embodiments, the system may comprise a database, storage device or other suitable storage means, which contains at least one canonical form (explained in more detail below). Additionally or alternatively, the system may comprise a plurality of canonical forms. In the embodiment shown in FIG. 2, a database comprising canonical forms is shown as being part of the first abstraction layer within the hub. In this case, one or more physical devices coupled to a first hub may be able to interconnect with one or more physical devices coupled to a second hub, without requiring a platform backend 32, since the canonical forms are stored within the first abstraction layer within the first and second hubs. However, the list of canonical forms may be centrally stored within the platform backend 32, within database 34 located elsewhere in the system, or elsewhere in the cloud or a remote server. In this case, the first abstraction layer may retrieve and/or store instances (local copies) of the remotely-stored canonical forms within the first abstraction layer as required. The canonical form(s) may be used by the first abstraction layer to strip a physical device (or each physical device, if there are multiple physical devices) of their implementation details so that the or each of the physical devices 22$a, b, c$ connected to the system are defined only by their behaviours/functionalities.

As explained in the glossary, a canonical form is a representation of an object (e.g. a physical device) in terms of its behaviour (or a set of minimum behaviours, or a set of functionalities), and includes a series of automatable tests to determine if an object complies with the behaviour(s) of the canonical form. For example, a canonical form may define a particular type of object's behaviour as "measuring and adjusting temperature". A processor may be configured to test a particular physical device against a canonical form to determine whether the physical device complies with the definition of the canonical form. In the example, the processor may be configured to check if the physical device can (i) measure temperature, and (ii) adjust temperature. A physical digital thermometer or temperature sensor can measure temperature but may not be able to adjust temperature and thus, the processor would determine that the physical device does not pass the test of that particular canonical form. A thermostat may pass the test because it can both sense and adjust temperature.

Additionally or alternatively, a physical object may have multiple different behaviours and these may be described by one or more canonical forms. For example, office printers are typically also able to scan documents and photocopy documents. Thus, a physical printer behaviours may be described by a canonical form which represents "printing", another canonical form which represents "scanning" and a third which represents "photocopying". Thus, at least some of the behaviours of a physical device may be mapped to a single canonical form, such that the physical device is described by more than one canonical form.

The processor (or other system component) may be configured to provide a local instance of a canonical device (i.e. a virtual device defined by some software), which represents the physical device in the system, and which has the behaviours defined by a canonical form. For complicated physical devices with different behaviours, a canonical device may be provided for each canonical form which describes the physical device behaviours. The canonical device has a state or set of states, can accept commands and can emit events as it senses changes in its state. The canonical device is preferably pre-defined in the system, and a database or store of canonical devices may be provided in the cloud/remote server. The first device abstraction module processor may retrieve a copy of the canonical device from the central database/store of canonical devices, and store a local copy within the first device abstraction module, for future use. This may be preferred if the first abstraction module is provided within the hub 28, because it can be used to store the canonical devices for all physical devices connected to it, to speed up communication with and data transfer between the hub and connected physical devices. In the example scenario, the processor may provide a canonical thermostat to the first device abstraction module, which represents a physical thermostat and has the behaviours defined by the relevant canonical form. The canonical thermostat may be used by the system to monitor and/or control the associated physical thermostat. Thus, the monitoring/controlling is simplified because the system does not need to know anything about the brand or version of the physical thermostat in order to interact with the physical thermostat. The system only needs to know that the physical thermostat has certain pre-defined behaviours.

Canonical forms may preferably define device behaviours using a particular system of units of measurement, such as the International System of Units (or SI units). For example, canonical forms associated with measuring temperature may specify that the temperature is measured in degrees Celsius (° C.). Using a system standard or common system of units of measurement within the system may enable physical devices to be monitored and/or controlled without needing to know the precise unit of measurement used in a physical device. A device driver associated with a physical device (explained in more detail below), may be configured such that it can receive commands using a system standard unit of measurement and implement them in the physical device accordingly. The device driver may be able to map the system standard unit of measurement to the measurement used by the physical device (e.g. from ° C. to ° F.), such that the platform or system itself does not need to know what units of measurement are used by the physical device(s).

In other words, a behaviour (or set of behaviours) of a canonical form is a specification provided as a series of automatable tests for how a device should behave. The scope of a canonical form would include the 'normal' behaviour of the device and how it can be monitored and managed so that external entities (usually synthetic devices, as explained below) can understand the state of any device that conforms to a specific canonical form. A canonical form may be defined for physical, canonical and/or synthetic devices. In the above example, different brands of physical thermostat will be follow the same canonical form(s) if they can both measure and control temperature. Thus, the system can use this physical device abstraction to monitor and manage all physical thermostats that follow the same canonical form(s) in the same way. This is much simpler than having to adapt the system for all variations between physical devices. Furthermore, the canonical forms may enable tests to be performed on any system components that interact with a device (physical or canonical, or synthetic), to check that the components work correctly when interacting with the device. Tests can be performed individually or in concert, thus making it possible to test large numbers of combinations of instances of device types in software, without the time and resource constraints of setting up a real environment with physical devices. The canonical form enables 'testing down' to confirm that a new physical device supports the abstraction and 'testing upwards' to confirm that anything interacting with a (canonical) device supporting a specific canonical form behave as expected.

Turning back to FIG. 2, the system 20 provides a platform to connect together consumer electronic goods (i.e. the physical devices 22a,b,c) and control devices such as smartphones, tablets and PCs (and/or apps 38 running on the control devices). Although FIG. 2 shows multiple physical devices 22, it will be appreciated that at least one physical device may be connected into the system for control/monitoring. The platform used to implement the system (i.e. software or hardware architecture) may be provided in a local (e.g. in-home) hub device 28, or in the cloud/remote server(s). Additionally or alternatively, the functionalities of the platform may be distributed between the hub 28 and the cloud/remote server, which enables greater flexibility in the hardware hub itself. (If the platform is provided in the cloud/remote server(s), it may remove the need for physical devices 22a,b,c to connect to the platform via a hub. As shown in FIG. 2, a physical device 22a,b,c may be able to connect to the platform directly via the gateway 30. A distributed or remote-only platform may enable physical devices which are located in a mobile location (e.g. in a vehicle, or with/on a person), or which are mobile physical devices, to connect to the system as they may not need to connect via a physical hardware hub 28 located in a specific place. For example, a physical device may be a sensor (e.g. an accelerometer, gyroscope, barometer, etc.) within a smartphone. In embodiments, the physical sensor may be connected into the system for control/monitoring via the internet capability of the smartphone itself, rather than via a hub device.

As shown in FIG. 2, the hub 28 sits between the physical device(s) 22a, b, c and the cloud/remote server(s). The hub 28 enables the typically low-power physical devices in the home/office to connect with the platform, by translating between internet protocols and multiple different communication protocols used by the physical devices. Additionally, the hub 28 may connect to simple devices which do not have a means to (or a need to) connect to the internet. The simple physical devices may be, for example, a kettle that is voice-activated, or a fitness tracker which itself does not have capability to connect to the internet, but does so by coupling to a 'base station' that can connect to the internet. The simple physical devices may be controlled or monitored by the system 20 once they are connected into the system, but ordinarily do not require connection to the internet to enable them to be operated. Thus, the hub 28 may be configurable to provide the function of such a 'base station', to enable data received from the fitness tracker to be uploaded to a website etc. The hub therefore may be able to replace the need for multiple 'base stations' for different physical devices, which could facilitate the creation of a connected environment. In another example, the efficiency or energy usage of a simple physical device may be monitored by the hub (so that a user is informed if the physical device is not operating correctly or as efficiently as possible, for instance), but it may not be possible to control the simple physical device itself using the platform/system. In other words, data may flow in one direction for such simple physical devices connected to the system, i.e. from the device to the system only. For other physical devices, data may flow in both directions.

The hub 28 may comprise at least a networking abstraction layer or module 24, which enables one or more physical devices of any type to connect to the hub 28 using any connection means (e.g. the ZigBee communication protocol, the Z-wave wireless communications protocol for home automation, IPv4 and IPv6 internet protocols, application protocol stacks etc.) without the rest of the system needing to know the exact communication means a physical device is using to connect to the hub. Additionally or alternatively, the networking abstraction layer 24 may be provided as a separate module elsewhere in the system, between the one or more physical devices and the gateway 30, particularly for those physical devices which are mobile and not affixed or permanently located in one position (e.g. wearable technologies). Wherever it is provided within the system, the networking abstraction layer enables one or more physical devices 22a,b,c to connect to the platform, without the need for the physical devices to use the same communication protocols in order to connect into the system. This overcomes the need for manufacturers of devices to adopt a single common communication protocol in their devices, and thus, the networking abstraction layer 24 provides the radio or protocol stacks that enable the connectivity of devices in the home/office. Furthermore, system components can receive data from, and send instructions/data to, a physical device without needing to translate between different communication formats/protocols. This may enable the monitoring and controlling of devices by the system to be simplified.

Figure 5A:
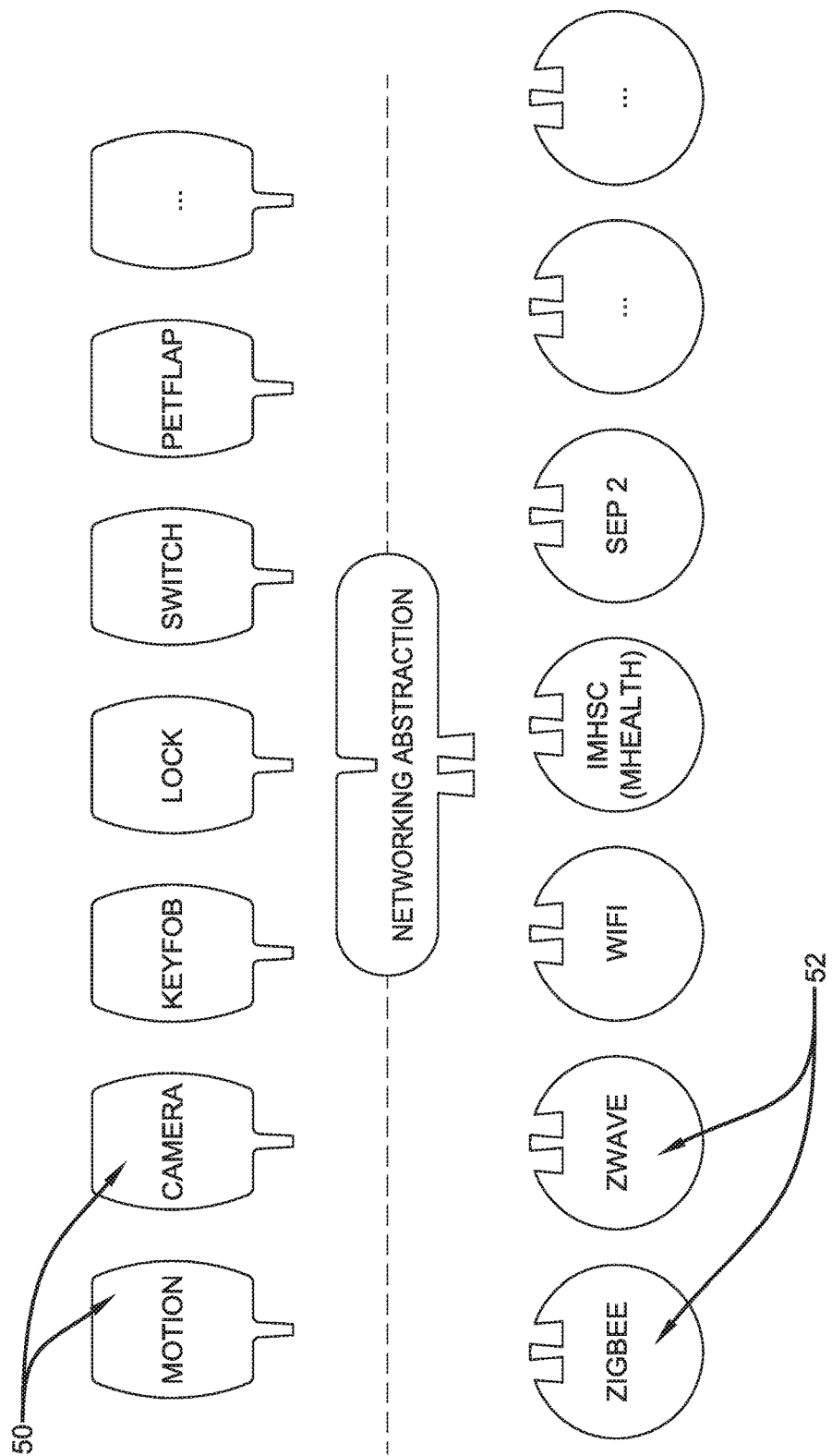
FIG. 5a shows a schematic of the network abstraction used to connect physical devices in the system of FIG. 2.

FIG. 5a shows a schematic of the network abstraction (and device abstraction) used to connect physical devices to the system of FIG. 2. Physical devices may communicate via different communication protocols 52 such as ZigBee, Wi-Fi, etc. The networking abstraction layer is provided between the physical devices and the canonical devices 50 which are used to represent the physical devices in the system. Examples of canonical devices 50 shown here are motion sensors, cameras, locks, pet doors, etc. Protocol abstraction at the network layer enables devices of different types and which use different communication protocols 52 to connect into the system. (There are currently 70 to 100 different network protocols). The networking abstraction layer translates data received by a physical device into a particular format suitable for the canonical devices 50/the platform. Similarly, any control instructions provided by the system with respect to the canonical devices 50 are forwarded to the corresponding physical devices via the networking abstraction layer, which formats the instructions/data into the format suitable for the physical devices. Thus, data can flow between the system/canonical devices and the physical devices without any need to know which communication protocols the system or physical devices are using. Advantageously, the networking abstraction avoids the combinatorial impact of different physical device types and network protocols 52. The functionality of a physical device is essentially de-coupled from the connectivity of the physical device. The device abstraction is achieved by abstracting real, physical devices as canonical devices 50 with state tables (as explained earlier), thereby enabling new physical devices to be incorporated into the system more readily, and enabling more complex "fusion" propositions to be written.

Returning to FIG. 2, the system 20 may comprise a second device abstraction layer/module (also known as an "archetype module"). The second device abstraction module may be provided within the platform backend 32, or alternatively, may be provided in the hub 28, or distributed between the hub and the cloud/remote server. The second device abstraction module may comprise a database, storage, or suitable storage means for storing a plurality of synthetic devices. A synthetic device is a virtual device (piece of software) which embodies intelligence for other devices (physical, canonical or synthetic) that complies with a particular canonical form. Synthetic devices may be formed by combining one or more canonical devices with a proposition/rule that defines how the canonical devices are combined to define the overall behaviour/function of the synthetic device. Synthetic devices may be formed by combining one or more canonical devices with one or more synthetic devices, and/or by combining two or more synthetic devices. All synthetic devices which follow the same canonical form are equivalent, because they have the same behaviour/function. Thus, a canonical form defines the minimum function or a set of functions/capabilities of a synthetic device.

Figure 6:
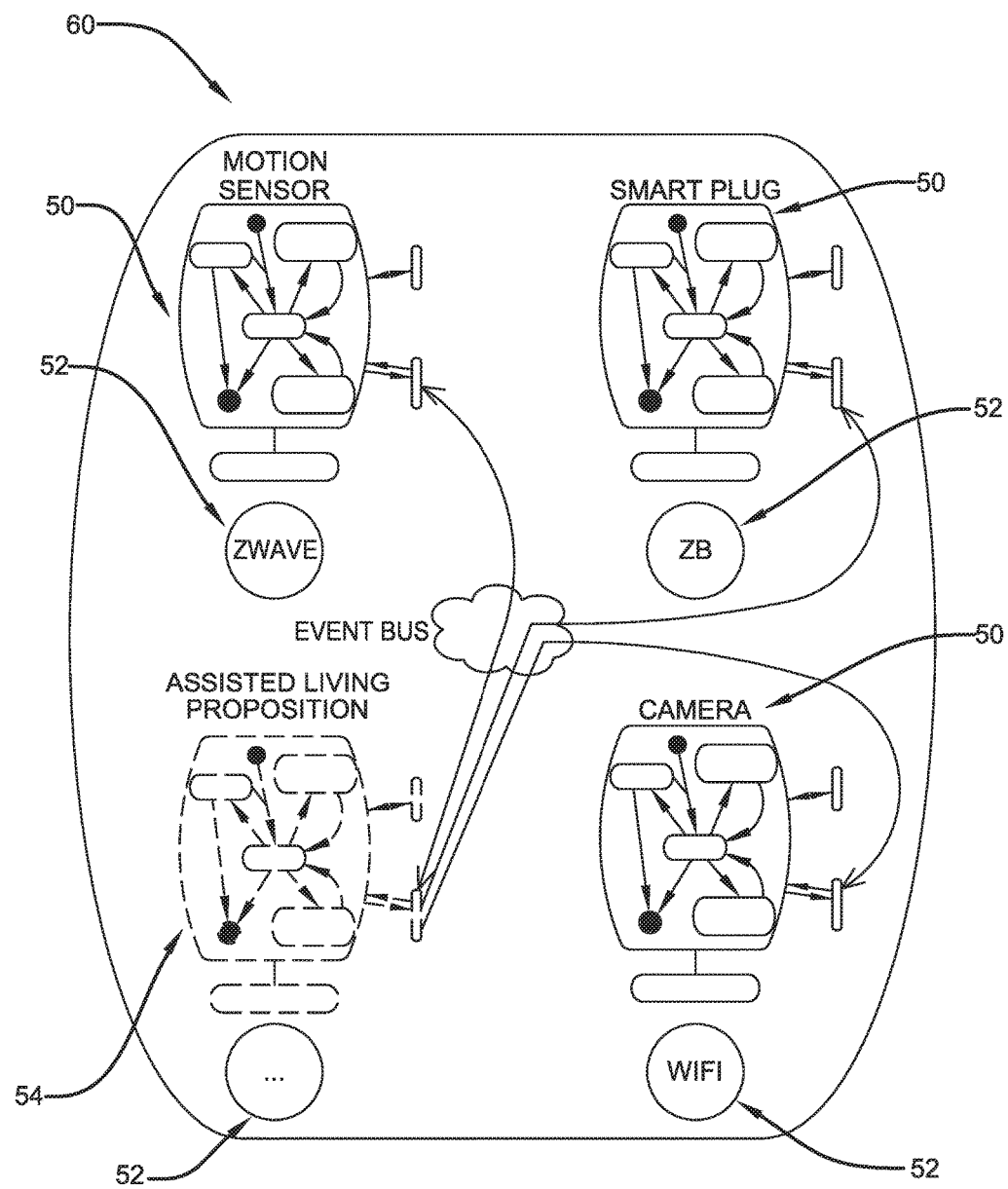
FIG. 6 depicts a schematic of an example of a synthetic device composed of multiple canonical devices.

A user may be able to monitor and/or control a synthetic device via their user-end control device 39a,b,c or app 38. Consequently and indirectly, a user may be able to control real, physical devices that underlie the synthetic device. An example of a synthetic device is shown in FIG. 6 and described in more detail below. If the second device abstraction module is provided within a hub, one or more physical devices coupled to a first hub may be able to interconnect with one or more physical devices coupled to a second hub, without requiring a platform backend 32, since the synthetic devices are stored within the second abstraction module within the first and second hubs.

The platform backend 32 may preferably be accessible via the cloud, and may comprise software necessary to link together devices, applications and analytics software. The platform backend 32 may comprise one or more databases or storage mediums 34 to store data analytics software, the at least one pre-defined canonical form, the at least one pre-defined canonical device, and/or (pre-defined) synthetic devices. The backend may comprise servers, processors, software, a hub manager, a rules manager etc. The database(s) may include an SQL or a NoSQL database, depending on how data is stored and managed within the system. The database(s) may also be used to store an object capability model.

Generally speaking, an object capability model is a software-based computer security model that attaches authorisations or permissions ("capabilities") to entities that wish to access a service or data/information from an object. A capability specifies what services/data an entity can access from or with respect to an object. The model uses the capabilities as the primary means of providing authority and controlling access to the objects (or their services/data). In the context of the present invention, the model may, in embodiments, be used to define the permissions that different parties may have in relation to devices (physical, canonical and/or synthetic) in the system, such that access to the controls or data associated with a device is controlled. More specifically, in an object capability model, if a program has a reference to an operator/method on an object it implicitly has authority to use it. The program cannot see or access things (e.g. data) that it is not allowed to see/access. The model may remove the need to check at runtime whether a particular individual/program is allowed to do something. The object capability model is described in more detail below.

Figure 3:
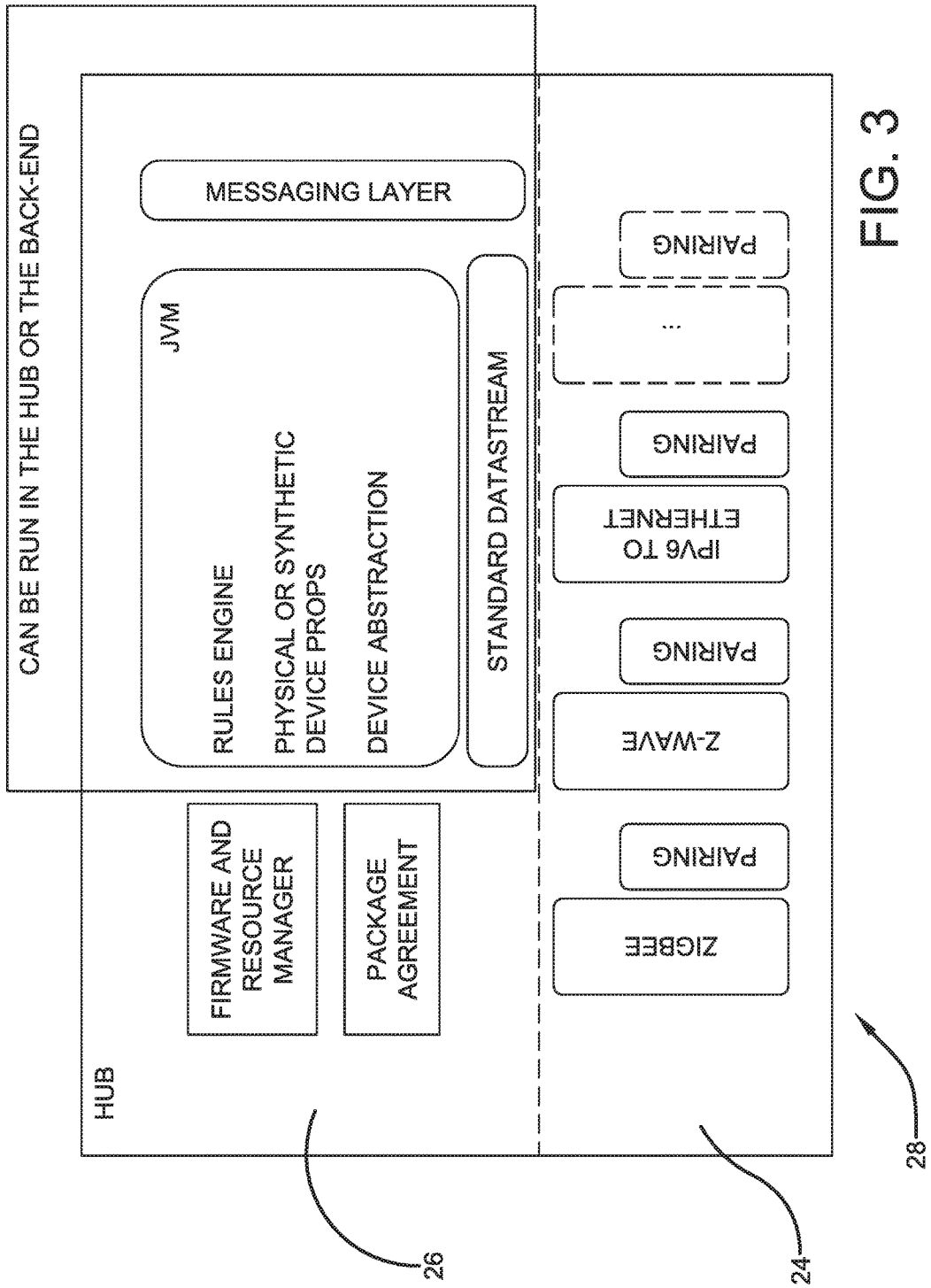
FIG. 3 shows a block diagram of features and capabilities within the hub device shown in FIG. 2.

FIG. 3 shows a schematic of the hub 28 of FIG. 2. As previously mentioned, the hub 28 may comprise a networking abstraction module 24 to remove the specific details of the communication protocols used by the one or more physical devices connected to the hub 28. This enables other system components to communicate with the physical devices without needing to format data received from and data sent to the physical devices in specific (and different) formats for each protocol. The translation is performed by the networking abstraction module 24. The hub 28 may also comprise processors, memory, non-volatile memory, and storage means. The hub 28 may further comprise firmware, to provide the control program(s) for the hub, and a resource manager(s), to manage and prioritise memory and processor usage in the hub on a per application basis.

As shown in FIG. 3, the hub 28 may also comprise a number of features which in embodiments may be provided in the platform backend:

a Java Virtual Machine (JVM), a process virtual machine that can interpret Java code for the hub's processor, so that the processor can interpret any instructions provided in the Java programming language. An advantage of using Java is that software can be developed without having to rewrite or recompile the software code for different platforms, as the JVM can interpret the bytecode for the peculiarities of each platform the software is run on. Embodiments of the system distribute intelligence and co-ordination between the connected environment and the platform in such a way that the user is unaware of, and unaffected by, where the computer code is running. This may be achieved by using the same programming language (e.g. the Java® language) for both the hub and the cloud service, and by the abstraction of networks and devices, which together allows application logic to run in-home (i.e. in a fixed local location) or in-cloud without change. This may hugely ease software development and provide a consistent user experience. However, the system is not limited to receiving Java-based instructions only. The system may be configured to work using additional or alternative programming languages that may require additional or alternative virtual machines to carry out the same interpretation function;

a rules engine—this may contain rules or policies specifying actions that the hub 28 may be able to perform with respect to the physical devices. An example rule may be, "given a kettle and an electricity meter are connected to the system, if the kettle is switched on, and if the electricity meter indicates the power drawn is above a threshold level, record the total energy used by the kettle". The rules engine may be provided as the second device abstraction module/layer;

device abstraction modules—one or both of the first and second device abstraction modules;

canonical forms, and/or instances of canonical and synthetic devices, stored within a database or storage means within the hub;

a messaging layer—this may comprise a message bus to transport messages between applications. The messaging layer may use a protocol such as Advanced Message Queuing Protocol (AMQP) to control how messages are transported between a message provider (hub) and a client (a software application running in the cloud/remote server), preferably in combination with message broker software (such as, but not limited to, RabbitMQ) which acts to at least implement the messaging protocol. The messaging layer may enable the hub 28 to communicate with software running in the platform backend 32;

a (standard) datastream—a type of broadband network connection, particularly used in the United Kingdom.

Device Abstraction

Figure 4:
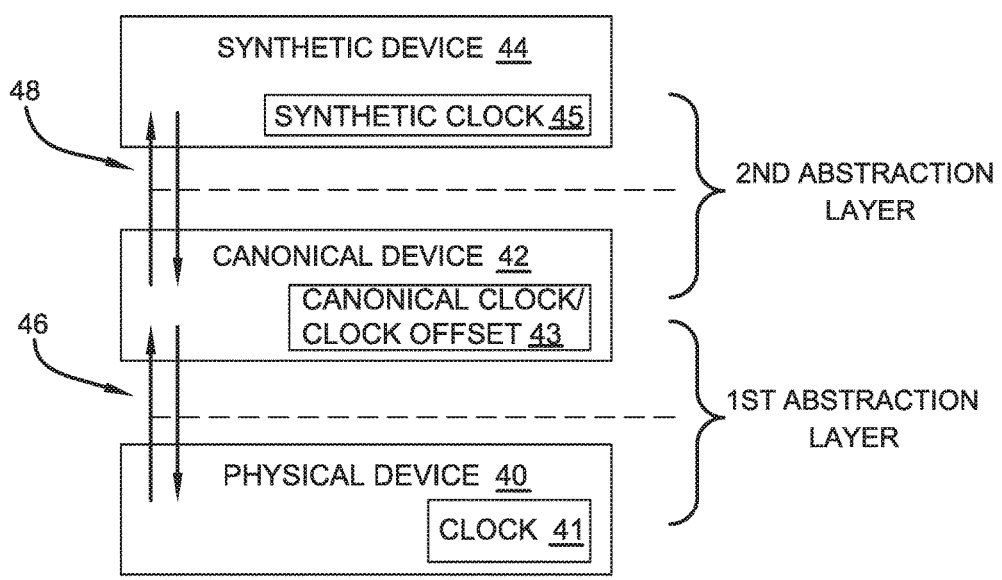
FIG. 4 is a schematic of the device abstraction of the present invention.

As mentioned above, the system does not contain any specific technical details of the one or more physical devices connected to the system, which may enable the creation and management of the platform to be simplified. This is achieved by providing two layers of abstraction between the device and the application used to monitor/control the device, preferably in combination with an object capability model. FIG. 4 shows a schematic of the two layers of abstraction. The first device abstraction layer translates between the real, physical devices 40 and virtual, canonical devices 42. As shown, there is a two way communication between the physical and canonical devices. For example, data may be sent from the physical devices to the canonical devices and control commands from the canonical devices to the physical devices.

The first device abstraction layer may be provided either in the hub or in the cloud. The canonical devices 42 define the behaviours of the real, physical devices 40 with which they are associated. The canonical devices 42 have a state or set of states (e.g. "on", "off", etc.), can accept commands and can emit events as the sense changes in their state. The state(s) of a canonical device may also be queried. This first device abstraction layer may enable users to connect together devices in their homes/offices without worrying about the precise technical specifications of their devices, thereby significantly easing device connectivity and creation of a "connected environment". Similarly, developers of the platform and software applications used to monitor/control physical devices may not have to write code suitable for the different technical specifications of the physical devices. Instead, they may develop software and computer programs for the canonical devices, which do not include the specifics of the real-world devices. The abstraction modules can perform the necessary modifications to enable the generic software to interact with the physical devices.

The system may take the abstraction further by providing a second device abstraction layer. The second device abstraction layer translates between canonical devices 42 and synthetic devices 44. As shown, there is a two way communication between the synthetic and canonical devices. The synthetic devices 44 may be remote from the physical device and/or the hub, i.e. they may be accessible via the cloud. Alternatively, local instances of synthetic devices may be provided in the hub. The concept of a synthetic device is explained later.

Object Capability Model

The platform backend may also comprise means to implement an object capability model. The object capability model is a computer security model that comprises a collection of "objects" that are connected to each other by "capabilities", and which uses the capabilities as the primary means of providing authority and controlling access to the objects. An object capability model may be provided for each of the canonical devices and/or the synthetic devices in the system. The model enables the permissions for users and/or the canonical/synthetic devices themselves to be individually defined for each device. The model may also determine the programming approach and programming languages used to implement the model within the system.

The model may be used to grant access to one device by another device. For example, a synthetic device composed of multiple canonical devices may be granted access to the data/outputs of the canonical devices, but not to the settings of the canonical devices. In another example, a canonical security system may be granted the right to turn on or re-position a canonical security camera (and thereby, the physical security camera with which it is associated), but not have the right to turn on/off a canonical (and physical) recording device that records the images captured by the physical camera.

The model may be used to grant access to users for limited functions (e.g. monitoring only), and for limited periods of time. Different objects may have different permissions. For additional security, the object capability model may use a caretaker object to store and define the permissions in relation an object. A caretaker pattern is a design pattern of writing software which is capable of providing revocable capabilities. The caretaker object gives revocable rights to users/third parties in relation to a device. The model can destroy the caretaker object as and when necessary, which removes access to a device. This may be particularly useful for consumer devices for which it is difficult to grant access to the device and/or data produced by the device. For example, a patient may be given a real health monitor by her doctor, which enables the doctor to remotely monitor the health of her patient. However, the patient may not be able to access the data collected by the health monitor themselves. The use of caretaker objects in the object capability model may enable a doctor to grant permission to a patient to access the data from the health monitor, but not to tamper with the data or change the device settings. The object capability model may be provided with reference to the canonical health monitor (or one or more canonical devices) that is associated with the real-world health monitor. This may enable a doctor to provide the same level of permissions to all her patients who have a health monitor, by simply defining the permissions of the canonical health monitor. The permissions of all the real-world health monitors which conform to the canonical health monitor will be automatically configured in the same way.

Connecting Physical Devices to the Platform

Figure 7:
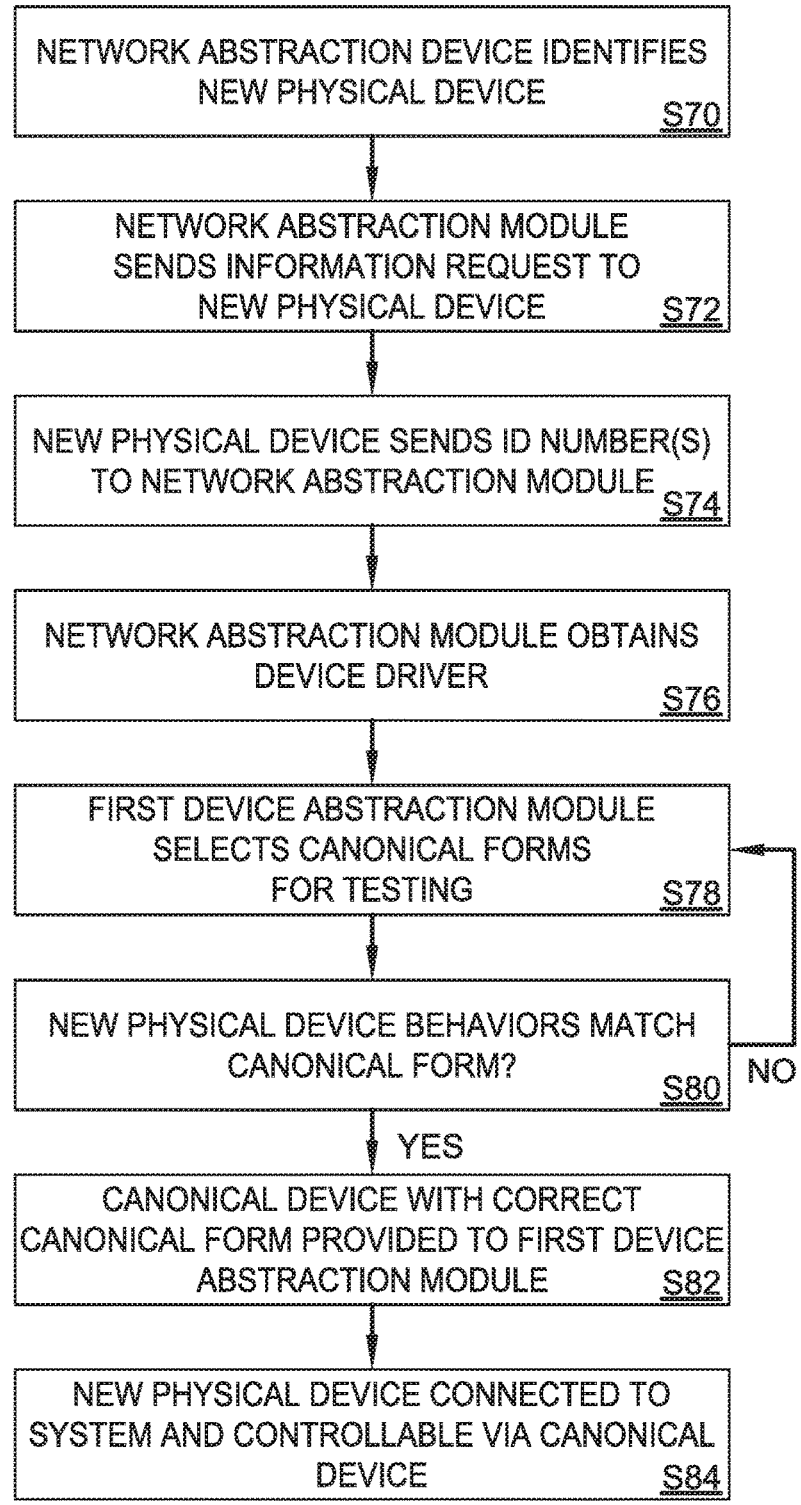
FIG. 7 is a flowchart outlining example steps in a process to connect a physical device into the system of FIG. 2.

As previously mentioned, the canonical forms define behaviours and tests to determine if a physical device (or a synthetic device) conforms to the defined behaviours. The canonical forms may be stored in the system, and may be called when a new physical device attempts to connect to the system. The canonical forms may be provided within the first device abstraction layer, or may be provided elsewhere, e.g. stored in the platform backend 32. FIG. 7 shows a flowchart illustrating example steps taken by the system of FIG. 2 when a new, physical device attempts to connect to the system. The flowchart shows how the system identifies the type of the physical device which is trying to connect to the system, by running through canonical form tests.

A new physical device may automatically attempt to connect to the system when switched on, or a user may take steps to connect the device to the system. A physical device may attempt to connect to the system directly through a gateway, or via an in-home hub device, as previously outlined. Whatever method is used, the networking abstraction module, which is located between the one or more physical devices and the system/platform, the networking abstraction module identifies or recognises that a new physical device exists in the environment and is attempting to connect to the system (S70). The networking abstraction module may comprise a processor or microprocessor within the module that is configured to perform the following steps to identify the physical device. The networking abstraction module (processor) transmits a message to the new physical device asking it to identify itself (S72). The new physical device sends a message back to the networking abstraction module with some information (e.g. identifiers or ID numbers) to help identify the device (S74). For example, physical devices which connect to a hub by a USB connection may include two ID numbers: a vendor ID, identifying the vendor or manufacturer of the physical device; and a device ID, identifying a specific device (model, type, etc.) made by the vendor. Physical devices which connect to the networking abstraction module in different ways may transmit the same or similar identifying information. The networking abstraction module uses this to obtain the appropriate device driver in order to communicate with the new physical device (S76). Device drivers are pieces of software that operate/control a physical device that is attached to a computer/computing system. The driver provides a software interface to the physical device, so that computer programs can access the hardware functions of the physical device without needing to know the precise details of the hardware itself.

The driver may be obtained from a store located within the system, or may be obtained from elsewhere (e.g. from a manufacturer's website accessed via the internet). In the case where a hub is used to connect the physical device into the system, a local copy of the driver may be stored in the hub so that it can be accessed easily. (The system/hub may be configured to periodically check for updates to the driver and to download updated versions as necessary). In the case where the physical device only provides the networking abstraction module with general information, e.g. that it is "a printer", the networking abstraction module may obtain a generic device driver that is suitable to provide the software interface. For example, it may obtain a generic printer driver which is sufficient to interact with the physical device.

Once the driver is obtained, the first device abstraction module attempts to map the physical device to one of the at least one pre-defined canonical forms, by trying to find one or more canonical forms which have the same behaviours/functions as the physical device (S78). In the case of a physical device having one function (e.g. a printer that is only able to print), the first device abstraction module maps the physical device to a pre-defined canonical form that defines that function. (If the system comprises a single pre-defined canonical form, the first device abstraction module must still check that the canonical form defines the same function as that of the physical device). Similarly, in the case of a physical device having two or more functions (e.g. a machine that is able to print, copy and scan), the first device abstraction module attempts to map each function to one or more pre-defined canonical forms that correspond to those functions.

The device abstraction module may comprise a processor/microprocessor configured to perform the mapping. The first device abstraction module may already have a clue as to the type of the new physical device, because the device driver has already been identified. This may help the device abstraction module to select a subset of the pre-defined canonical forms to test. For example, if a device driver for a 'printer' has been obtained, the device abstraction module may select those pre-defined canonical forms that relate to 'printers', 'print-and-scan devices', 'print-and-copy devices', 'photo-printers' etc. to check whether the physical device has any additional functions/behaviours, so that the correct canonical form is found. Additionally or alternatively, if the physical device is a printer with other functions (e.g. scanning and copying), the device abstraction module may select those pre-defined canonical forms which relate to "printing", "copying" and "scanning". The device abstraction module may test the canonical forms one-by-one to determine the type of the new physical device (S80). Once the canonical forms that match one or more of the behaviours of the new physical device has been identified, the device abstraction module obtains/provides one or more canonical devices that behaves according to the matched canonical form(s) (S82). The canonical devices are an abstracted version of the new physical device, and is used by the system to monitor/control the new, connected physical device (S84). However, if one or more of the behaviours of the physical device cannot be mapped/matched to a canonical form, the physical device cannot be connected to the system, or may only have limited functionality (e.g. only those behaviours which have been represented by canonical devices may be controllable/monitorable by the system). The device abstraction module may send a message to the system administrator with any information known about the new physical device, which may enable new canonical forms to be written accordingly.

It will be appreciated that similar steps may be used to associate one or more canonical forms with a synthetic device, to enable a synthetic device to be monitored/controlled by the system.

Example: Canonical Device

Figure 5B:
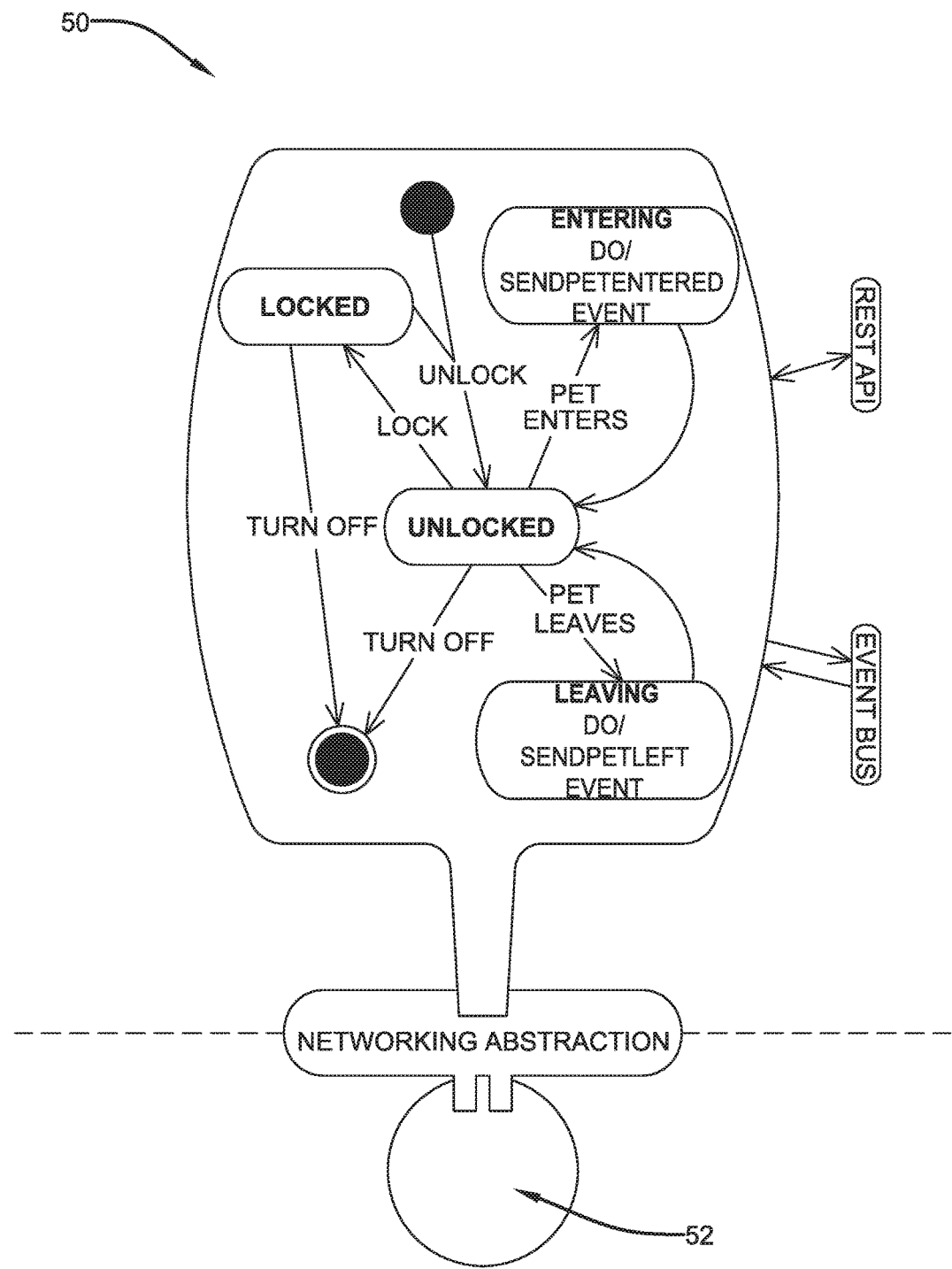
FIG. 5b shows a schematic of an example of a canonical device.

FIG. 5b shows an example of a canonical device 50. The canonical device is defined independently of the network protocol 52 that may be used by the real, physical device. A state or set of states is defined for each canonical device based on the canonical form behaviours associated with the canonical device. The set of states may include whether the device is "turned on", "turned off", "performing function x", "performing function y", etc. The functions x, y are specific to the behaviours of the canonical device, as defined by the canonical form. For example, for a thermostat, the states may include "measuring temperature", "changing temperature", "turning boiler on", "turning boiler off", "on", "off", etc. The canonical device may emit an event when the associated physical device is identified as being in a particular state, or when it is transitioning from one state to another. The canonical device may preferably define the actions or possibilities that can occur when the device is in a particular state. For example, if the canonical device is in an "off" state (because the associated physical device is also "off"), the possible actions are to remain in the current state, or to move to the "on" state. The canonical device may be used to turn on the associated physical device, by controlling the canonical device to move from the off state to the on state. This command is provided to the associated physical device by the system (in embodiments, via the hub device), to turn on the physical device. The pre-defined actions limit how the canonical (and physical) device may behave or be controlled.

Each canonical device may include an application programming interface (API) that defines how particular software components of the canonical device interact with each other. The canonical device may interact with the platform and with other devices via additional APIs, such as a representational state transfer API (or REST API), which is an abstraction of the world wide web, and an Event API or Event Bus to receive notifications of an event (e.g. notifications of a change in state in the associated physical device).

The example canonical device 50 shown in FIG. 5b is a canonical pet-flap or pet-door. The behaviours of the physical smart pet-door may have been broadly identified as 'sense the presence of a pet', 'open the pet-door when a pet is sensed to be in the vicinity of the pet-door', and 'close/lock the pet door when a pet is not sensed to be in the vicinity of the pet-door'. As mentioned earlier, the canonical devices may comprise state tables indicating the possible states the device can be in. The words in boxes within the canonical device represent possible states of a particular canonical device. In this example, the canonical pet-door may be in the "locked", "unlocked", "entering" or "leaving" state. The arrows between states define the actions that may result in a change in state, and define the possible options available when in a particular state. For example, if the pet-door is in the "locked" state, then it may stay locked, or it may move to a "turned-off" state, or it may be moved to an "unlocked" state, as shown by the arrows pointing away from the "locked" state box. Similarly, if the physical pet-door is unlocked, a pet may be passing through the pet-door. If the physical door is sensed to move in one direction (e.g. in towards a house), the pet may be entering a house through the pet-door, and the state moves from the "unlocked" state to the "entering" state (however temporarily). The change to the "entering" state may trigger an event or alert to let the system or an owner of the pet know that the pet has returned home. Similarly, if the pet-door is sensed as moving in the opposite direction, the canonical device moves from being in the "unlocked" state to the "leaving" state (however temporarily), where the change of state may trigger an event or alert. For example, if the device is in the "leaving" state, then the canonical device may trigger an event to "lock" the associated physical pet-flap for security. The events/alerts/commands may be transmitted via the event bus to other system components to enable the action to be implemented in the real, physical device.

Example: Synthetic Device

As mentioned earlier, a synthetic device is a composable logic block which can be used to provide new, virtual devices that may enable more user-friendly and understandable monitoring of a connected environment. FIG. 6 shows an example synthetic device formed of a number of canonical devices 50 including (in this case) a motion sensor, a smart plug and a camera, which may each use a different communication protocol 52 to connect to the internet/gateway. Synthetic devices may be formed of two or more canonical devices, two or more synthetic devices, or a combination of one or more canonical and synthetic devices. The canonical devices are linked to each other through an event bus, which enables notifications to be shared between the devices (e.g. through the event API of each device). The synthetic device 60 may also comprise a proposition or rule 54, which may be termed an assisted living proposition. The system processor receives inputs or data from the canonical devices and processes these inputs/data according to the rules/propositions of the synthetic device. The processor determines the state or output of the synthetic device dependent on the combination of the canonical device data and the rules.

Embodiments of the present system/platform may enable the one or more physical devices installed for one function or purpose to be used simultaneously for other functions, creating an explosion of value for end-users. For example, a physical device such as a thermostat for sensing temperature in a home may be used by a synthetic device for occupancy detection. In this example, a 'high' sensed temperature in a house or in an individual room in a house may be used by the synthetic occupancy detection device to determine that the house (or room) is currently occupied by a person. If the home owner did not expect the house to be occupied at that particular time, then the home owner may be alerted to the heating being on in an empty home, or the possibility of an intruder in the home. Thus, the output of a simple temperature sensing device could be used to provide a virtual security system.

As previously mentioned, a device rules engine may be provided within the system to contain rules or policies specifying particular actions that may be performed with respect to the physical devices in a particular connected environment. For example, in the case of a physical device such as a home heating system or thermostat, the rule specified for the physical device may simply be to "turn down the heating when the home is empty". Additionally or alternatively, the rules may be much more complex. For example, a burglar alarm system may have arming grace periods, partial-set modes etc., and thus the rules associated with the physical alarm system may be "turn on the alarm system if all the rooms in the house are determined to be empty for a period of time", or "turn on the alarm system on the ground floor of the house at night". The platform provides a simple framework where these application rules can be expressed, and they may be run in the home, in the cloud, or across both, without having to be rewritten to account for new devices. This is because the rules can be expressed in relation to the canonical representations of the real physical devices. For example, if a physical device breaks and is replaced by a new physical device that performs the same function but is made by a different manufacturer, the new physical device can be integrated into the platform without requiring the rules to be adapted to account for the precise technical specifications of the new physical device.

The example synthetic device shown in FIG. 6 shows how three canonical devices 50 may be combined with a proposition or rule 54 to provide "assisted living". The canonical motion sensor, canonical smart energy monitoring plug, and canonical camera may be combined to provide additional information about a home in which the associated physical devices are located. The synthetic device receives inputs from the physical devices (via their canonical representations), and processes the inputs according to the rules to determine if a property is occupied or not. The synthetic device could be used to monitor an elderly relative living on their own, to check remotely if they are in their home and okay. An example of a table of rules is set out below:

|  | Scenario 1 | Scenario 2 |
| --- | --- | --- |
| Input from "motion sensor" | Motion detected | Motion not detected |
| Input from "smart plug" | Energy being used by TV | Energy being used by TV |
| Input from "camera" | Person detected in images | Person detected in images |
| Output | Property occupied by person moving about. | Property unoccupied or person unwell |
| Event/Action | None (person is okay) | Alert sent to carer |

In the first scenario, the motion sensor and camera detect a person moving about in a home, who may be watching television. The fact they are moving about suggests that the person is well and the synthetic device is configured not to take any action. In the second scenario, energy is being drawn by the television, and although a person is detected by the camera, the motion sensor indicates they are not moving. This may because the person is asleep in front of the television, or because they are unwell or have fallen. The synthetic device may be configured to send an alert to a carer, a doctor, relative or the emergency services if the inputs received from the canonical devices don't change after a period of time. Thus, the synthetic device may be used to monitor and assist a person living on their own without being intrusive.

In another example, consider a home comprising a plurality of physical devices. The physical devices may be a smartphone, a thermostat and a boiler all connected to the system. The physical devices are mapped to canonical devices termed "mobile device", "temperature sensor" and "heating system" by the system in order to be monitored and/or controlled. A synthetic device termed an 'occupancy detecting' device comprises the canonical devices "mobile device", "temperature sensor" and "boiler" together with propositions/rules which define the functions or capabilities of the synthetic device. The synthetic occupancy detector provides a user with a single, virtual, user-friendly device that may be used to monitor the occupancy of a property (e.g. the user's home or office).

The synthetic device receives inputs from the physical devices (via their canonical representations), and processes the inputs according to the rules to determine if a property is occupied or not. An example of a table of rules is set out below:

|  | Scenario 1 | Scenario 2 |
| --- | --- | --- |
| Input from "mobile device" | Detected in property | Not detected in property |
| Input from "temp sensor" | Set for comfort | Set for comfort |
| Input from "heat system" | On | On |
| Output | Property occupied | Property not occupied |
| Message | None | Alert sent |

In the second scenario above, the user is alerted to the fact that the boiler is firing in an empty property. To save energy, the user may use the synthetic device to turn off the boiler, or turn down the thermostat setting remotely (or they may use other software to perform these operations remotely). The synthetic device therefore has a capability that the individual physical devices may not possess on their own.

If the synthetic occupancy device also comprises a canonical device related to a security camera/motion sensor located in a property, the synthetic device can use the inputs from the devices to check if there is an intruder in the property. For example, the table of rules can be expanded as follows:

|  | Scenario 1 | Scenario 2 |
| --- | --- | --- |
| Input from "mobile device" | Detected in property | Not detected in property |
| Input from "temp sensor" | Set for comfort | Low setting |
| Input from "heat system" | On | Off |
| Input from "camera" | Movement detected | Movement detected |
| Output | Property occupied | Intruder |
| Message | None | Alert sent |

In this case, the rules determine that there is an intruder. The processor which is applying this synthetic device may be configured to automatically send a message/email to the home owner or to a security service to alert them to the possible intruder.

In this example, the object capability model may grant a home owner full control over a synthetic 'occupancy detecting' device, so that they can configure the device for their home/office. The model may also grant a home owner with the right to control their heating system remotely. (The permission is in relation to the canonical device which maps to the real-world heating system). The user may themselves be able to grant limited permissions to a third party in relation to the heating system. For example, the home owner may grant permissions to other people living in the home with respect to the temperature settings in their own bedrooms. In another example, a user may grant their gas supplier with the right to monitor the operation of the boiler when it is turned on, so that the gas supplier can check if the boiler is operating correctly and inform the user of a potential problem. However, for security, the gas supplier may not have the right to control the heating system itself (e.g. to change the thermostat setting), in order to minimise the risk of any malicious, unauthorised activity. Similarly, the gas supplier may not have the right to monitor or access boiler on/off times because such information may indirectly indicate whether a property is occupied or not, which could be used maliciously.

Figure 8:
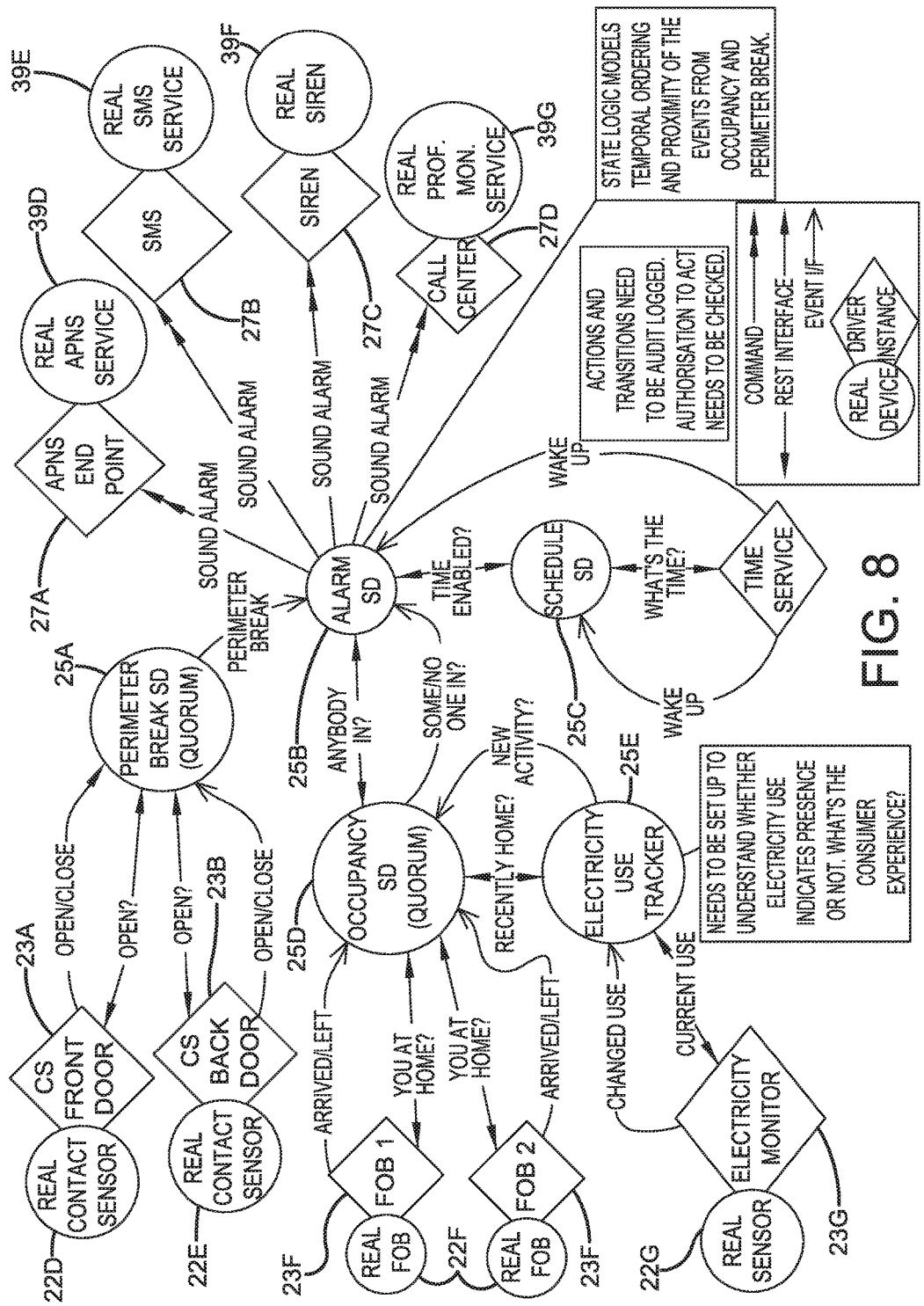
FIG. 8 shows an example of a connected environment formed using the system of FIG. 2 comprising multiple physical, canonical and synthetic devices.

FIG. 8 shows a schematic of an example configured environment consisting of real, canonical and synthetic devices. The connected environment may include a variety of physical devices such as electricity usage monitors, sensors, key fobs, and services such as an SMS service. These are all communicated with via canonical representations, shown by the diamonds. The canonical devices are used to determine the state of the associated physical device and the information may feed into a synthetic device.

For example, a first synthetic device 25a termed a perimeter break SD comprises the canonical devices 23a, 23b for the physical devices 22d,e (i.e. contact sensors on a front and back door in a property). The physical devices are for two different sensors and thus have two different canonical devices—a front door CS and a back door CS. If the synthetic device 25a receives input from one or both of the physical devices via the associated canonical device that a door is open, the synthetic device may send a message indicating that there has been a perimeter break to a second synthetic device 25b which is an alarm SD 25b. The first synthetic device may regularly poll the physical devices via the canonical devices (on a REST interface) to query whether or not the door is open.

This second synthetic device 25b communicates with a plurality of user devices including a APNS service 39d, a SMS service 39e, a siren 39f and a professional monitoring service 39g each associated with and controlled via different device driver instances 27a-d. User-end devices (e.g. smartphones or tablet computers) may not be controllable by the system via canonical devices/synthetic devices. However, as mentioned above, individual sensors or functions in a user-end device may be controlled/monitored by the system via canonical devices that match the function(s) of the sensors. Similarly, certain user-end device processes (e.g. the ability of a smartphone to send an SMS message) may be accessible by the system (e.g. to send an SMS message). As shown, the second synthetic device 25b may access the APNS service 39d on a user device via the device driver instance 27a to send a command to each of the user-side devices to sound an alarm, if certain conditions are met.

The second synthetic device 25b also combines two further synthetic devices, a schedule SD 25c and an occupancy SD 25d. The occupancy SD 25d comprises two physical devices namely two user fobs 22f which communicate with the occupancy SD via their own associated canonical fobs 23f. Although the user fobs belong to different users and may be made by different manufactures, they have the same canonical form. The location of each fob is tracked and a message is sent from the physical device via the canonical device to the synthetic device when a user arrives or leaves the location (e.g. the home). The synthetic device may regularly poll the physical devices via the canonical devices to query whether or not the user of each fob is home. The occupancy SD sends a message to the alarm SD when either someone enters or leaves the home. The alarm SD may regularly poll the occupancy SD as to whether or not anyone is home. This is because if the perimeter break signal is timed with the normal occupant entering the home, no alarm needs to be sent out.

The occupancy SD also comprises an electricity use tracker synthetic device 25e comprises one physical device which is a sensor 22g which communicates with the electricity use tracker synthetic device 25e via a canonical device which represents an electricity monitor 23g. A change in electricity use is monitored by the sensor and a message is sent from the physical device via the canonical device to the synthetic device when a change is detected. The synthetic device may regularly poll the physical devices via the canonical devices to query whether the current use has changed. When the electricity use tracker synthetic device 25e determines that electricity use has changed it sends a message to the occupancy SD to indicate that there is new activity which may indicate that a user is home. The occupancy SD may regularly poll the electricity use tracker synthetic device 25e. This synthetic device needs to be set up to understand whether electricity use indicates whether or not a user is present. This can be based on a typical consumer experience. A message from the electricity use tracker synthetic device 25e that a user is home may also trigger the message from the occupancy SD to the alarm SD.

Both the schedule SD 25c and the alarm SD 25b may receive a message from a time service canonical device to wake up, for example based on a user set schedule. The alarm SD may only thus be activated after receiving this message. The alarm SD may poll the schedule SD to check that time has been enabled and the schedule SD may poll the time service canonical device to check the time.

Thus, if the synthetic alarm receives data from other synthetic devices that indicate that a property is occupied when the people living in the property aren't there, the synthetic alarm sends a command to one or more physical devices (via their canonical representations) to send an SMS alert to the home owner or a security service, or to sound a real alarm. The object capability model may be used in this connected environment to allow a security service to have temporary access to the output of a security camera in the property, so they can check if the property is being broken-into before sending out personnel to the property. The permissions may be granted temporarily and only if the synthetic alarm sends an alert to the security service alerting them to the possible break-in. The permissions may be revoked as soon as the situation has been dealt with and the synthetic alarm reverts back to the state where it has not detected a break-in.

Time Synchronisation

As mentioned earlier, in the system of FIG. 1, the internal clocks 11 of physical devices 12 may be out of sync with each other and/or out of sync with a reference clock 15 by the same or different amounts. Rather than require each physical device to periodically poll an external reference clock to update/synchronise its internal clock with the reference, embodiments of the present invention provide a way of holding time within the canonical and/or synthetic devices. Thus, in embodiments, any time-dependent commands made with respect to the physical devices (e.g. switch off the boiler at 12:30) are made with respect to the time held within the canonical device associated with the physical device, and/or the synthetic device.

As shown in FIG. 2, the physical devices 22 may each comprise an internal clock 21. In embodiments, the canonical device(s) associated with a physical device 22 may comprise a canonical, reference clock. In embodiments, it is the instance of the canonical device stored in the hub 28 which comprises the canonical clock, thereby leaving the global canonical devices stored elsewhere (e.g. in a database in the cloud/remote server) unmodified. The canonical clock within each instance of a canonical device may be a call to obtain time from a reference clock. The reference clock may be a single reference clock defined within the system 20 that is accessible by all components of the system and used by all components for synchronisation. In embodiments, the reference clock may be call to obtain time from a single external clock located external to the system, such as one which provides Coordinated Universal Time.

Additionally or alternatively, the system may comprise a clock offset for each physical device connected to the system, and in embodiments, each instance of a canonical device may comprise this clock offset rather than a canonical clock. The clock offset specifies a difference between the time specified by the reference clock and the internal clock 21 of the physical device with which the canonical device is associated. For example, if the clock 21 of a physical device 22 states that the current time is 12:30, and the canonical clock/reference clock states the current time is 12:33, the clock offset records that there is a difference of minus three minutes (−3 minutes) between the canonical/reference clock and physical clock 21, i.e. that the physical clock is running 3 minutes slower than the canonical/reference clock. Similarly, if the clock 21 of a physical device 22 states that the current time is 12:40, and the canonical clock/reference clock states that the current time is 12:33, the clock offset records that there is a difference of plus seven minutes (+7 minutes) between the canonical clock/reference clock and the physical clock 21, i.e. that the physical clock is running seven minutes faster than the canonical clock/reference clock. The clock offset may be considered as a map between the physical clock 21 and the canonical/reference clock, and is therefore defined or recorded for each instance of canonical device. Preferably, each instance of canonical device specifies the clock offset with reference to an external reference clock, such that only the clock offset, and not a clock itself, is held within each instance of canonical device. Advantageously, this may enable the implementation of actions/commands to be simplified as all the canonical devices are effectively referencing and synchronising with a single external clock.

The clock offset allows a user to control the physical devices 22 without a user of the system 20 requiring any knowledge of the clock 21 of the physical device. For example, a user may use the system 20 to remotely program a boiler within his home to turn on at 17:30 in order to heat the property before he arrives at home. The user may input the command into the system via his control device (e.g. a smartphone 39*b*), which is received by the system and sent to the instance of the canonical device associated with the physical boiler. The instance of the canonical device comprises a clock offset which, for example, states that there is a difference of +7 minutes between the clock of the physical device and a reference clock. The clock offset is used by the canonical device to map the time in the time-dependent instruction received from the user, to a time in the physical device. In this example, the canonical device instructs the physical boiler to turn on when the clock 21 reaches 17:37, to account for the fact the boiler's clock 21 is running seven minutes ahead of the reference clock.

Similarly, a user may input a time-dependent command with respect to a synthetic device. Here, each canonical device which forms the synthetic device comprises a clock offset. Each clock offset may be different, and thus, by defining a reference clock and/or clock offsets within the synthetic device and canonical devices, a user may input a single time-dependent command in relation to multiple physical devices without needing any knowledge of the physical clocks.

In embodiments where a canonical clock is provided within each instance of a canonical device, the canonical clocks may each be synchronised with each other and with a reference clock. For example, the canonical clocks may use the Network Time Protocol (NTP) to synchronise each canonical clock to within a few milliseconds of Coordinated Universal Time. Advantageously, this removes the requirement for the clocks within the physical devices to be synchronised.

Whether each canonical device comprises a canonical clock and/or a clock offset, it may be necessary for the clock offset within each instance of a canonical device to be regularly checked to ensure the offset amount remains correct. Thus, a processor in the first device abstraction module may poll the clock 21 of each physical device 22 that is connected to the hub 28. The processor may update the clock offsets defined within each instance of canonical device. The frequency of the polling (and thus, the frequency of the clock offset updating) may depend on the time accuracy required in the system or by a particular device.

Since any time-dependent actions performed by a physical device 22 are specified in the system with reference to a single system reference clock (or the canonical and/or synthetic clocks), the physical device's own clock 21 is less important. However, if the connection between the physical device 22 and hub 28 is lost (e.g. if the hub 28 malfunctions or a connection to the internet is lost), the physical device 22 may be configured to revert back to using its internal clock 21 to perform any time-dependent actions that are stored within the physical device.

In preferred embodiments, time-dependent commands are sent to the device driver of a physical device for application based on the time on the reference clock. The internal clock 21 of a physical device 22 is essentially ignored. For example, if a time-dependent command is to turn a thermostat temperature up to a required temperature at 14:00, the device driver is configured to adjust the thermostat temperature when the reference clock reaches 14:00, regardless of the time of the internal clock. Thus, time synchronisation is simplified by simply implementing time-dependent commands using the reference clock.

However, such time-dependent control may only be possible when the device driver is able to query the reference clock for the current time. If the device driver cannot do so, because, for example, the connection required to query the external clock has temporarily been lost, the device driver may switch to using the internal clock of the physical device to apply time-dependent commands.

Testing Device Behaviours Over Time

Holding time or clock offsets within the canonical/synthetic devices (or within a simulation module) may also enable the system to test the behaviour of the connected physical devices. Emergent behaviours may only be identified when multiple components or entities within the system are combined. Broadly speaking, a system which comprises one physical device 22 may operate well, but when a second physical device is added, the combination of the devices may result in problems in the system. For instance, the hub may not know how to deal with messages received from the two physical devices at the same time, or how to map each physical device to its correct canonical device, etc. In another example, a set of physical devices which behave correctly individually may not behave correctly when they are being sensed and/or controlled simultaneously via a synthetic device. The combination of the layered abstraction architecture (i.e. the first and second abstraction levels/modules) and the time held within the canonical/synthetic devices may enable changes in the system (e.g. the addition/removal of a physical, canonical or synthetic device, or a change to the settings of a physical, canonical or synthetic device) to be tested before being finalised. Additionally or alternatively, a simulation module, which contains copies of device drivers associated with physical devices, may be used to test time-dependent commands before they are implemented within a physical device. An instance of the device driver or software used to control/operate a physical device is stored in the simulation module and used to test how the software behaves when it is given a particular time-dependent instruction. This enables software bugs to be identified in advance of any actions being implemented in the physical devices. In particular, the test may be run by speeding up time within the system so that the test is run over a length of time (e.g. over 24 hours, a month, a year, a leap year, etc.). This may be useful to check whether any emergent behaviours arise after a length of time. The speeding-up of time is possible because time is held within the canonical/synthetic clocks. Thus, the system may be able to test parts of the system in isolation over a year long period by artificially speeding up the system's reference time (or the canonical/synthetic clocks), where the test may only last a few moments in real time.

Turning back to FIG. 4, this shows a block diagram illustrating the layered architecture of embodiments of the present invention. As previously explained, each physical device 40 is associated with an instance of a canonical device 42, and the physical device comprises a clock 41. The instance of the canonical device also comprises a canonical clock and/or a clock offset 43. One or more canonical devices may be combined to form a synthetic device 44, as mentioned earlier, where the synthetic device may comprise its own synthetic clock 45 (which may be a call to obtain a time from a single system clock, or a call to obtain a time from a single external reference clock). The physical device 40 may be controlled by a user via the canonical device and/or the synthetic device. Any time dependent commands received with respect to a synthetic device may be implemented either with reference to the synthetic clock 45, or with reference to a canonical clock within one of the canonical devices that forms the synthetic device. Additionally or alternatively, the canonical clock(s) 43 and synthetic clock(s) 45 may each be synchronised with Coordinated Universal Time via the Network Time Protocol (NTP), such that it does not matter which of the canonical or synthetic clocks is used.

The layered architecture may enable the system to be tested, in particular over artificially accelerated periods of time. In embodiments, test doubles may be used to automate the testing of the system. The boundaries between the abstraction layers may be separately testable, and in particular, may be tested from above and below the boundary. For example, a first test 46 to test the boundary between a canonical device and the physical device with which the canonical device is associated may comprise testing the mapping between the physical device 40 and the canonical device, and the mapping between the canonical device 42 and the physical device (as indicated by the pair of arrows 46 pointing in opposite directions). This two-way test between the canonical device and physical device enables the system to check, for instance, if the canonical device is able to send messages to the physical device, and if the physical device is able send messages back to the canonical device. Similarly, a second test 48 is performed in both directions between the synthetic device and the canonical device.

The testing of the devices, and of the device abstraction, enables problems in the software in the system to be identified. In particular, since all physical devices that are represented by the same canonical device have the same function (as defined by a canonical form), testing the canonical device may enable all physical devices associated with the canonical device to be automatically batch-tested. This may remove the need to have to individually and manually check the physical devices. The test-double approach may be used to check whether instructions set by the user are correctly interpreted by each device in the system and correctly implemented by each device (whether physical, canonical or synthetic). This may help to identify and fix any potential problems a user could face when trying to operate a real-world device via the platform.

Figure 9:
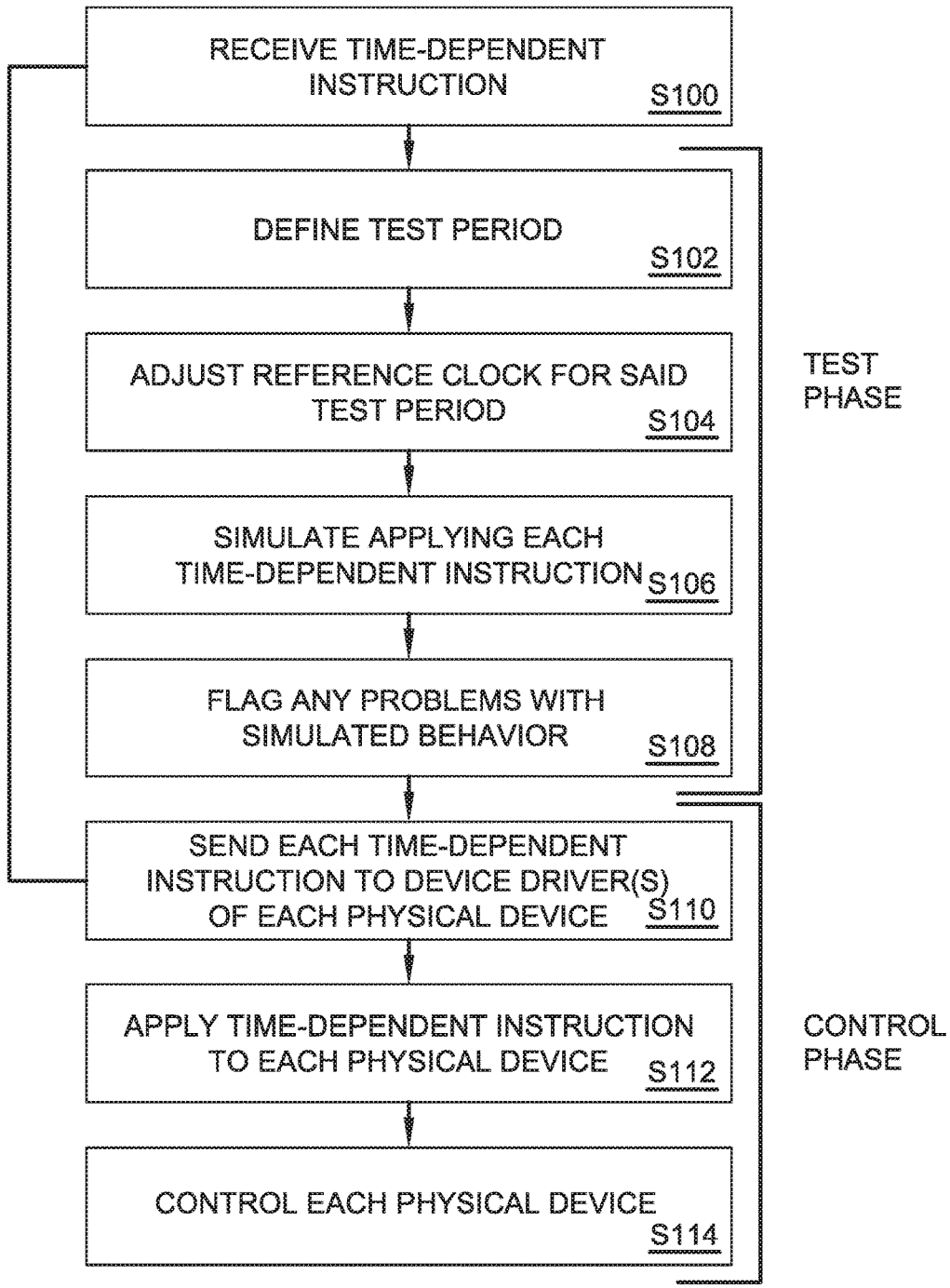
FIG. 9 is a flowchart outlining steps in a testing and control phase for the system of FIG. 2.

FIG. 9 is a flowchart illustrating a testing method. The first step (S100) is to receive a time-dependent instruction for one of the physical devices in the system. By time-dependent, it is meant that the physical device is to be controlled according to the instruction at a particular time. Time is obtained from a reference clock which may be in the system or reference by the system as explained in more detail above. As shown in FIG. 9, once the instruction is received, the system can proceed to a test phase in which the instruction is tested or direct to the control phase in which the instruction is implemented.

To enable the testing, the system may be configured to inject time into the software associated with a physical, canonical and/or synthetic device (e.g. the device driver associated with the device). Thus, time values within the software code are substituted throughout the code with time obtained from a reference clock. The period over which the time-dependent instructions are to be tested is first defined (S102). The test period may be a period of hours, days or even months or years and may start immediately or at some point in the future. The test period may also comprise a set sequence of particular times. The next step is then to adjust the reference clock for the test period (S104). Adjusting may include stepping forward the time of the reference clock to the beginning of the test period. Where the test period is a long time period, adjusting may also include accelerating time to test the device or a schedule. For example, accelerating time can be used to check if the device operates correctly during ordinary years and leap years, and/or if the device operates correctly on days when daylight saving time takes effect. The reference clock may thus be thought of as a controllable time signal which may be used to set particular times in the code, set time sequences/periods for testing the code, and/or to accelerate time so that the code can be tested over periods of time.

The system is tested by simulating sending each time-dependent instruction to the physical device (S106). This simulation may be done by sending the instruction to a copy of the device driver associated with a physical device (where the copy may be stored in a database within the precedent module—as shown in FIG. 2, or within a simulation module). Alternatively, the simulation may use the or each canonical device associated with the physical device. In either case, the simulation checks whether each canonical device or copy of the device driver behaves as expected. It is possible that some of the time-dependent instructions will generate software bugs or other problems with the behaviour of the system. In this case, a notification or alert will be generated to flag the problems (S108). This then allows a user to adjust some of the instructions to solve the emergent behaviours or software bugs.

Simulation of device behavior/responses may be achieved by providing simulation code for each device to be simulated. A simulation module (e.g. implemented in Java) simulates the operation of the real physical device. The copy of the device driver (and/or the canonical device) then interacts with the simulation module for the device instead of the physical device itself. For example, the simulation module may simulate the response that would be received from an actual radio system with that device connected to it (in the case of a wireless device). This allows testing to be performed to check that devices interact properly with their device drivers. Furthermore, the simulation is preferably transparent to the higher levels in the control/abstraction hierarchy, allowing interaction via defined synthetic devices and/or canonical devices in the different abstraction layers as if a physical device were being used. This in turn enables interactions at the various levels of the abstraction/control hierarchy to be tested, if necessary in a time-accelerated fashion.

The testing phase may be done independently of or before a control phase. Once the testing is finished, the reference clock is reset to standard time (both hour and rate of time passing). The control phase may follow the end of the test phase (shown by the dashed line) or may be directly initiated by receipt of a time-dependent instruction. By performing the control phase only after a testing phase has been carried out, the number of real faults in the system may be reduced.

The first step of the control phase (S110) is to send each time-dependent instruction (which has been checked and determined to work as expected), to the device drivers of each physical device (or to the canonical device associated with a physical device and used to control the physical device). The device driver/canonical device then implements the time-dependent instruction in the physical device based on the time obtained from a reference clock (S112). Thus, each physical device is controlled by its device driver/canonical device (S114) using the reference time. If the device driver/canonical device cannot obtain the current time from the reference clock, the device driver/canonical device may revert to using the internal clock of the physical device to implement the time-dependent instruction.

For example, consider a thermostat with a schedule to get to a room temperature of 24 degrees C. at 2 pm on Thursdays. If the thermostat has its own internal clock, it may be configured to turn the heating on when its internal clock reaches 2 pm on Thursday. Adjusting for daylight saving time, for example, will be a manual exercise for the user, or subject to firmware updates.

If time in the thermostat is externalised as a service, the device driver/canonical device (or synthetic device) will have a model of wall clock time and take account of DST savings. Any residual internal clock could be used for standalone behaviour if the thermostat gets disconnected and the some backup schedule loaded into the device. The device driver/abstracted device may use a calendar service to kick off an action to turn the heating on to meet the required lead time and may then turn the heating on for the thermostat. The clock driving the device driver/abstracted device may be NTP synchronised and runs either on a hub or in the cloud.

No doubt many other effective alternatives will occur to the skilled person. It will be understood that the invention is not limited to the described embodiments and encompasses modifications apparent to those skilled in the art lying within the scope of the claims appended hereto and more generally, the foregoing has been a detailed description of illustrative embodiments of the invention. Various modifications and additions can be made without departing from the scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein the terms "process" and/or "processor" should be taken broadly to include a variety of electronic hardware and/or software based functions and components. Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Accordingly, this description is meant to be taken only by way of example, and not to otherwise limit the scope of this invention.

The invention claimed is:

1. A system comprising:
at least one physical device, wherein the physical device is addressable by the system, and wherein the physical device is operated or controlled by a device driver;
a simulation module which comprises storage means for storing a copy of the device driver for the at least one physical device; and
at least one processor which is configured to:
receive at least one time-dependent command for the at least one physical device, wherein time is obtained from a reference clock;
test system operation within the simulation module by a process including the steps of:
defining a test period;
adjusting said reference clock for said test period;
applying the at least one time-dependent command in said test period to the copy of the device driver associated with the specified physical device to simulate behaviour of the specified physical device; and
outputting any problems with the simulated behaviour of the specified physical device; and
control a physical device within the system by sending the time-dependent command to the device driver associated with the specified physical device, wherein the device driver applies the time-dependent command to the physical device.

2. The system as claimed in claim 1 further comprising a plurality of physical devices.

3. The system as claimed in claim 1 wherein the at least one processor is configured to adjust the reference clock to accelerate time for the test period.

4. The system as claimed in claim 1 wherein the reference clock is one of:
a single reference clock defined within the system; and
a call to obtain time from an external clock provided outside of the system.

5. The system as claimed in claim 1 further comprising a precedent module which comprises a database storing at least one pre-defined canonical device, wherein the canonical device corresponds to a pre-defined canonical form, the canonical form defining a set of minimum capabilities for a type of physical device, wherein the at least one physical device is associated with at least one canonical device which matches at least some capabilities of the physical device.

6. The system as claimed in claim 5 wherein the at least one processor is configured to test system operation by: defining a test period; adjusting said reference clock for said test period; sending each time-dependent command in said test period to the at least one canonical device which is associated with the specified physical device to simulate behaviour of the specified physical device; and outputting any problems with the simulated behaviour of the specified physical device.

7. The system as claimed in claim 5 further comprising an archetype module which comprises a database storing one or more synthetic devices, wherein each synthetic device comprises one or more canonical devices and at least one rule, the at least one rule defining how the one or more canonical devices are combined to form the synthetic device.

8. The system as claimed in claim 7, wherein the at least one processor is configured to test one or more of: the system by testing the behaviour of the one or more of synthetic devices during the test period; and an interface between each synthetic device and each associated canonical device over the test period.

9. The system as claimed in claim 5 wherein the at least one processor is further configured to test an interface between the at least one physical device and the associated canonical device over the test period.

10. The system as claimed in claim 1 wherein the at least one processor comprises a test processor which is configured to test system operation and a separate control processor which is configured to control each physical device.

11. The system as claimed in claim 1 wherein the test period has a duration of time specified in days, weeks, months or years.

12. The system as claimed in claim 1 wherein the test period includes at least one time-dependent instruction.

13. The system as claimed in claim 1 further comprising a user interface to enable a user to monitor and/or control the at least one physical device.

14. The system as claimed in claim 13 wherein the user interface is a graphical user interface provided on a computing device or mobile computing device, and time-dependent actions specified for each of the at least one of the physical devices are specified using the user interface with reference to the reference clock.

15. The system as claimed in claim 1 wherein the at least one processor is configured to implement an object capability model which defines the security permissions associated with each canonical device, wherein the object capability model is a computer security model defining the security permissions granted to a user and each canonical device to access functions and data of the canonical and physical devices.

16. The system as claimed in claim 15 wherein the object capability model grants permissions to the user and to each canonical device for a specified time period, wherein expiration of the time period automatically revokes the permissions.

17. The system as claimed in claim 15 wherein the user is a third party and wherein the object capability model is configured to grant permissions to the third party which limit the third party's access to the functions and data produced by the canonical and physical devices.

18. The system as claimed in claim 16 wherein the permissions granted for a specified time period for each canonical device are defined with respect to the reference clock.

19. The system as claimed in claim 1 wherein the reference clock is automatically synchronised with Coordinated Universal Time.

20. The system as claimed in claim 2 wherein the plurality of physical devices are located at one or more locations, wherein one of the one or more locations is a home or an office or a mobile location, such as a vehicle.

21. The system as claimed in claim 2 wherein the plurality of physical devices comprises a mobile device or a wearable device, located with or on a human or animal.

22. The system as claimed in claim 5 wherein the precedent module is located in a gateway or in a remote server.

23. The system as claimed in claim 5 wherein the at least one processor comprises a processor which is located in the precedent module and which associates each physical device to a canonical device.

24. The system as claimed in claim 1, wherein the at least one processor is configured to control each physical device in response to a user input on a user interface.

25. A method for testing a plurality of devices, services and applications which are interconnected in a single platform, the method comprising:
   receiving at least one time-dependent action specified for at least one physical device, wherein time is obtained from a reference clock;
   defining a test period;
   adjusting said reference clock for said test period;
   applying each time-dependent action in said test period to a copy of a device driver which is associated with the specified physical device to simulate behaviour of the specified physical device, wherein the copy of the device driver is a copy of a driver used to operate or control the at least one physical device; and
   outputting any problems with the simulated behaviour of the specified physical device.

* * * * *